United States Patent
Reeb et al.

(10) Patent No.: US 11,141,819 B2
(45) Date of Patent: Oct. 12, 2021

(54) METHOD AND DEVICE FOR THE IMPACT TREATMENT OF TRANSITION RADII OF A CRANKSHAFT

(71) Applicant: MASCHINENFABRIK ALFING KESSLER GMBH, Aalen (DE)

(72) Inventors: Alfons Reeb, Aalen (DE); Jochen Schmidt, Boebingen a.d. Rems (DE); Konrad Grimm, Aalen (DE)

(73) Assignee: MASCHINENFABRIK ALFING KESSLER GMBH

( * ) Notice: Subject to any disclaimer, the term of this patent is extended or adjusted under 35 U.S.C. 154(b) by 66 days.

(21) Appl. No.: 16/622,650

(22) PCT Filed: May 24, 2018

(86) PCT No.: PCT/EP2018/063690
§ 371 (c)(1),
(2) Date: Dec. 13, 2019

(87) PCT Pub. No.: WO2018/228791
PCT Pub. Date: Dec. 20, 2018

(65) Prior Publication Data
US 2021/0146488 A1    May 20, 2021

(30) Foreign Application Priority Data
Jun. 14, 2017  (DE) .......................... 102017113066.7

(51) Int. Cl.
*B23P 9/04* (2006.01)
(52) U.S. Cl.
CPC ............. *B23P 9/04* (2013.01); *B23P 2700/07* (2013.01)

(58) Field of Classification Search
CPC .......... B23P 9/04; B23P 2700/07; C21D 9/30; C21D 7/04
See application file for complete search history.

(56) References Cited

U.S. PATENT DOCUMENTS

| | | | | |
|---|---|---|---|---|
| 4,171,654 A | * | 10/1979 | Kreucher | .................. B23B 5/18 |
| | | | | 409/189 |
| 4,682,489 A | | 7/1987 | Bauerle et al. | |

(Continued)

FOREIGN PATENT DOCUMENTS

| | | |
|---|---|---|
| DE | 3438742 A1 | 4/1986 |
| DE | 3438742 C2 | 3/1988 |

(Continued)

*Primary Examiner* — Jun S Yoo
(74) *Attorney, Agent, or Firm* — Burr & Forman LLP; Harvey S. Kauget

(57) ABSTRACT

The invention relates to a method for the impact treatment of transition radii (8) of a crankshaft (4), in particular transition radii (8) between connecting rod bearing journals (5) and crank webs (7) and/or transition radii (8) between main bearing journals (6) and the crank webs (7) of the crankshaft (4). In order to apply an impact force (FS) to at least one of the transition radii (8) along the respective transition radius (8) circulating about the crankshaft (4) in an annular manner, a heavily loaded region (BMAX), a lightly loaded region (BMIN), and intermediate regions (BZW) lying therebetween are defined, and an impact treatment is then carried out such that the impact force (FS) introduced into the intermediate regions (BZW) is increased in the direction of the heavily loaded region (BMAX).

17 Claims, 9 Drawing Sheets

(56) References Cited

U.S. PATENT DOCUMENTS

| | | | |
|---|---|---|---|
| 6,160,248 A | 12/2000 | Ottenwaelder et al. | |
| 8,011,096 B2 | 9/2011 | Reeb et al. | |
| 9,015,939 B2 | 4/2015 | Reeb et al. | |
| 2007/0169532 A1* | 7/2007 | Reeb .................... | B24B 39/045 72/460 |
| 2014/0260787 A1 | 9/2014 | Kumar et al. | |
| 2017/0165742 A1* | 6/2017 | Tanaka .................... | F02B 75/32 |

FOREIGN PATENT DOCUMENTS

| | | |
|---|---|---|
| DE | 102005032185 | 1/2007 |
| DE | 102006058710 | 6/2008 |
| DE | 102007028888 | 1/2009 |
| DE | 112014000861 | 11/2015 |
| EP | 0788419 | 8/1997 |
| EP | 1034314 | 9/2000 |
| EP | 1479480 | 11/2004 |
| EP | 1612290 | 1/2006 |
| EP | 1716260 | 11/2006 |
| WO | 2015141611 | 4/2017 |

* cited by examiner

METHOD AND DEVICE FOR THE IMPACT TREATMENT OF TRANSITION RADII OF A CRANKSHAFT

BACKGROUND OF THE INVENTION

The invention relates to a method for the impact hardening of transition radii of a crankshaft, in particular of transition radii between connecting-rod bearing journals and crank webs and/or transition radii between main bearing journals and the crank webs of the crankshaft, as per the preamble of claim 1.

The invention also relates to an apparatus for carrying out the method for the impact hardening of transition radii of a crankshaft.

The invention also relates to a crankshaft.

Owing to the continuously progressing development and increasing performance of internal combustion engines and stringent emissions requirements placed on these, modern engines are consequently subjected to ever greater loading. For this reason, the motor industry places high demands with regard to strength inter alia on the crankshaft, which is subjected to high loading and which is important for the function of an internal combustion engine. Here, in terms of construction, there is often the demand for the crankshaft to be of low weight and for the space requirement to be small. For the design of the crankshaft, this means that an increase in the load capacity should be achieved not by increasing the cross section, that is to say by means of the section modulus of the crankshaft, but as far as possible by means of local internal compressive stress states. For this reason, modern crankshafts are produced using a wide variety of machining and heat treatment methods, such that the crankshafts can be subjected to increasingly higher levels of engine power.

Examples of such methods are thermal treatments, such as the surface hardening methods of induction and case hardening, laser hardening or nitriding, and strain hardening methods, such as deep rolling, shot peening or impact hardening. These are common and for the most part well-established methods, which are suitable for a wide variety of purposes.

With regard to examples of such methods, reference is made to the following documents: EP 1 479 480 A1, EP 0 788 419 B1, EP 1 612 290 A1, DE 10 2007 028 888 A1 and EP 1 034 314 B1.

Impact hardening in particular is an advantageous method for increasing the fatigue strength, in particular the bending fatigue strength and the torsional fatigue strength, of crankshafts. The increase in the fatigue strength is achieved here by virtue of impact forces being introduced into the crankshaft by cold working, preferably hammering by means of special impact tools, in the loaded regions at transitions in cross section and changes in cross section. As examples for such a process, reference is made to DE 34 38 742 C2 and EP 1 716 260 B1.

In order to prevent a disadvantageous introduction of shear stresses during the local hammering, it is proposed in DE 34 38 742 C2 that, at the time of the pressure pulse action, no relative movement be allowed to occur between the pulse-imparting body and the tool surface transversely with respect to the pulse direction. For this purpose, the feed motion during the introduction of internal compressive stresses by means of the impact tools should be performed in stepped fashion.

As a further development of this method, it has been proposed in EP 1 716 260 B1 for the crankshaft to be rotated continuously during the machining process, wherein, during the introduction of internal compressive stresses by means of the impacting of the impact tool against the crankshaft segment to be machined, the rotational movement of the crankshaft is stopped during the time in which the impact tool acts on the crankshaft. Here, the impact pressures are selected such that the rotational movement of the crankshaft is forcibly stopped by the impact movement.

For this purpose, however, complex components such as for example transmissions, clutches and/or spring systems are required within the drive device in order to prevent the drive device from being damaged by the "forced stops". Furthermore, the timing of the crankshaft and the introduction of the internal compressive stresses must be synchronized in a reliable manner in terms of a process. Here, the mechanical components required to ensure a robust installation are complex and expensive.

The present invention is based on the object of further developing the methods and apparatuses for impact hardening in order to further improve the fatigue strength of crankshafts.

Said object is achieved, for the method, by means of the features specified in claim 1 and, for the apparatus for carrying out the method, by means of the features specified in claim 15.

Finally, the invention is also based on the object of providing a crankshaft which is improved, in particular with regard to its fatigue strength.

With regard to the crankshaft, the object is achieved by means of the features specified in claim 16.

SUMMARY OF THE INVENTION

The dependent claims and the features described below relate to advantageous embodiments and variants of the invention.

In the method according to the invention for impact hardening, provision is made whereby transition radii of a crankshaft, in particular transition radii between connecting-rod bearing journals and crank webs and/or transition radii between main bearing journals and the crank webs of the crankshaft, are impact-hardened.

The connecting-rod bearing journals and the main bearing journals will hereinafter in some cases also be referred to merely as "journals" for simplicity. Here, the expression "journals" may refer both to the connecting-rod bearing journals and to the main bearing journals, and also only to the connecting-rod bearing journals or only to the main bearing journals. Unless explicitly stated otherwise, all three variants are encompassed by the expression "journals" here.

The invention is particularly preferably suitable for increasing the fatigue strength of, for example, crankshafts with a length of 0.2 to 8 m or more and/or main and connecting-rod bearing journal diameters of 30 to 500 mm or more. The invention is however very particularly preferably suitable for increasing the fatigue strength of large crankshafts with a length of 1.5 to 8 m or more and/or main and connecting-rod bearing journal diameters of 100 to 500 mm or more.

The crankshaft may have various types of transition radii, for example fillets, for example in a basket arch shape, or also undercut radii or radii with transitions. The transition radii may for example transition tangentially into the bearing journal points or running surfaces of the main and connecting-rod bearing journals.

This also applies for transitions to flanges, journals and other geometrical changes in cross section both for tangential and undercut radii.

The crankshaft commonly has transition radii at all transitions or changes in cross section. This applies in particular to changes in cross section between bearing journals and crank webs. The invention is particularly suitable for these. Transition radii may however also be provided for any other changes in cross section, in particular for changes in cross section at the end sections of the crankshaft, in particular at a transition to a flange, a disk or a shaft etc. A transition radius whose fatigue strength is to be improved by means of the method according to the invention and/or the apparatus according to the invention thus need not imperatively be present between a connecting-rod bearing journal and a crank web or a main bearing journal and a crank web, but may rather be arranged at any location of the crankshaft. The expressions "connecting-rod bearing journal", "main bearing journal", "flange", "journal" and/or "crank web" may be reinterpreted accordingly by a person skilled in the art.

The invention will be described below substantially on the basis of the hardening of transition radii between connecting-rod bearing journals and crank webs and/or main bearing journals and crank webs. This is however not to be understood as limiting, and is intended to serve merely for improved understanding or improved readability. Where reference is made to a transition radius in the context of the invention, this may basically be any transition radius at any location of the crankshaft.

According to the invention, provision is made whereby, for the introduction of an impact force into at least one of the transition radii, a highly loaded region, a lightly loaded region and interposed intermediate regions are defined along the respective transition radius running in annularly encircling fashion around the crankshaft (in particular around the connecting-rod bearing journal and/or main bearing journal), wherein impact hardening is performed such that the impact force introduced into the intermediate regions is increased in the direction of the highly loaded region.

The introduction of an impact force can be understood to mean that an impact head of an impact tool, or a so-called "header" of an impact device, impacts against that region of the crankshaft which is to be hardened, in the present case a transition radius. Here, the impact is performed in targeted fashion at the desired impact position along the transition radius running in annularly encircling fashion around the journal.

In the present case, a highly loaded region means a region of the respective transition radius of the crankshaft which is subjected to particularly high loads, in particular during engine operation, for example tensile forces etc. For the load capacity of the crankshaft, the consideration of the highly loaded regions of the transition radii is of central importance. The highest internal compressive stresses should be preferentially introduced into these regions.

A highly loaded region may mean a region along the circumference of the transition radius and/or a region along the respective transition radius running in annularly encircling fashion around the crankshaft or around the connecting-rod bearing journal and/or the main bearing journal.

For example, a region around the so-called bottom dead center of a connecting-rod bearing journal may be a highly loaded region within the meaning of the invention. The bottom dead center is the region which, during engine operation, can be referred to as tension side of the connecting-rod bearing journal or as being opposite the pressure side.

The methods and apparatuses according to the prior art provide that, during the impact hardening of a transition radius, a constant impact force is introduced along the respective transition radius running in annularly encircling fashion around the connecting-rod bearing journal and/or the main bearing journal. Here, the impact force is selected so as to suffice to introduce sufficient internal compressive stresses into the highly loaded regions of the crankshaft.

For the robustness of the crankshaft, it is however not necessary for the same internal compressive stresses to also be introduced into the scarcely loaded regions or the lightly loaded regions (and the intermediate regions). Fully encircling impact hardening of a transition radius along the circumference of the crankshaft entails high outlay.

It would accordingly be preferable for (high) internal compressive stresses to be introduced only into the one or more highly loaded regions of the transition radii.

On the basis of simulations and test series, the inventors have found that the robustness or fatigue strength of the crankshaft can advantageously be realized with unchanged or improved quality even if the maximum impact force that is introduced into a particular transition radius is introduced only into the highly loaded region, and if the impact force is increased proceeding from the intermediate regions in the direction of the highly loaded region.

In this way, an abrupt or sudden change of the impact force from one impact to the next impact is avoided.

By virtue of the fact that the transition radii are now no longer hardened in fully encircling fashion (with the same impact force), the processing speed can be maximized, and damage to the connecting-rod bearing journal at top dead center can be avoided or ruled out. The method according to the invention and the apparatus according to the invention are thus particularly efficient and economical. At the same time, it is possible for crankshafts to be produced with at least the same quality or robustness as with the known methods of the prior art.

The focusing on the highly loaded regions of the transition radii can even result in an improvement in robustness.

The method according to the invention and the apparatus according to the invention may also be applied or used in the case of crankshafts which have already been machined beforehand using other methods in order to increase the fatigue strength characteristics thereof. For example, a crankshaft that has been hardened by induction hardening can retroactively also be improved with regard to its bending and torsional fatigue strength by means of an introduction of internal compressive stresses in accordance with the method according to the invention and/or using the apparatus according to the invention.

In one refinement of the invention, provision may be made whereby the impact force introduced into the intermediate regions is increased steadily in the direction of the highly loaded region.

In particular, a highly loaded region may be provided which is surrounded on both sides by intermediate regions, whereby the highly loaded region is separated from the lightly loaded region.

In the context of the invention, provision may basically be made whereby the impact force within the intermediate regions and/or the lightly loaded region follows any desired profile, wherein it is however preferable for abrupt changes in the impact force to be avoided, and for the impact force to preferably be at its highest (in particular at a maximum, considered in terms of an average and/or in a sum of all individual impact forces of the transition radius) in the highly loaded region of the transition radius.

The impact force introduced into the intermediate regions is preferably increased monotonously, very particularly preferably strictly monotonously, in the direction of the highly loaded region.

In one refinement, provision may be made whereby the impact force introduced into the intermediate regions is increased uniformly and/or linearly in the direction of the highly loaded region.

It is also possible for the impact force introduced into the intermediate regions to be increased in the direction of the highly loaded region in accordance with any desired mathematical function.

In one refinement of the invention, provision may also be made whereby, during the impact hardening, no impact force or only an impact force lower than or equal to the lowest impact force introduced into the intermediate regions is introduced into the lightly loaded region.

Provision may preferably be made whereby no impact hardening of the transition radius is performed in the lightly loaded region.

In one refinement, provision may finally also be made whereby, during the impact hardening, an impact force higher than or equal to the highest impact force introduced into the intermediate regions of the transition radius is introduced into the highly loaded region.

It is preferably the case that only the impact force required to attain the desired fatigue strength is introduced in each region, wherein the impact force is increased or reduced preferably uniformly in the direction of regions for which a different impact force is advantageous.

In one refinement, provision may be made in particular whereby the impact force that is introduced into the highly loaded region during the impact hardening is determined on the basis of the desired fatigue strength of the crankshaft and/or the desired fatigue strength of portions of the crankshaft.

It may thus suffice, in order to attain the desired fatigue strength of the crankshaft and/or the desired fatigue strength of portions of the crankshaft, to take into consideration only the required impact force in the highly loaded regions.

In one refinement, provision may also be made whereby the impact force that is introduced into the highly loaded region during the impact hardening is constant or is kept constant over the highly loaded region.

In simulations and tests, it has been found that a high fatigue strength and/or robustness of the crankshaft can be achieved in particular by introducing a (high) impact force with a constant intensity into the highly loaded region. This applies in particular (but not exclusively) if, proceeding from the highly loaded region, impact forces of decreasing intensity, in particular impact forces which decrease linearly from one impact to the next impact, are introduced in each case into the intermediate regions, which impact forces may be reduced to zero in the lightly loaded region.

In one refinement, provision may be made whereby, along the transition radius running in annularly encircling fashion around the connecting-rod bearing journal, the highly loaded region amounts to at least ±20°, preferably at least ±30°, more preferably at least ±40°, particularly preferably at least ±50°, very particularly preferably at least ±60°, for example at least ±70°, at least ±80° or at least ±90°, proceeding from a most highly loaded point of the connecting-rod bearing journal.

It is also possible for an upper limit for the extent of the highly loaded region along the transition radius running in annularly encircling fashion around the connecting-rod bearing journal to be defined, according to which the highly loaded region amounts to at most ±90°, preferably at most ±80°, more preferably at most ±70°, very particularly preferably at most ±60°, for example ±50°, for example at most ±40°, at most ±30° or at most ±20°, proceeding from the most highly loaded point of the connecting-rod bearing journal.

The most highly loaded point of the connecting-rod bearing journal is in particular the bottom dead center of the connecting-rod bearing journal.

Provision may thus be made in particular whereby the highly loaded region is defined along the circumference of a journal proceeding from a most highly loaded point of the journal. In one refinement, provision may furthermore be made whereby, along the transition radius running in annularly encircling fashion around the main bearing journal, the highly loaded region amounts to at least ±20°, preferably at least ±30°, more preferably at least ±40°, particularly preferably at least ±50°, very particularly preferably at least ±60°, for example at least ±70°, at least ±80° or at least ±90°, proceeding from a most highly loaded point of the main bearing journal.

It is also possible for an upper limit for the extent of the highly loaded region along the transition radius running in annularly encircling fashion around the main bearing journal to be defined, according to which the highly loaded region amounts to at most ±90°, preferably at most ±80°, more preferably at most ±70°, very particularly preferably at most ±60°, for example at most ±50°, for example at most ±40°, at most ±30° or at most ±20°, proceeding from a most highly loaded point of the main bearing journal.

This also applies analogously for transitions to flanges, journals and other geometrical changes in cross section both for tangential and undercut radii.

Simulations and/or calculations and/or series of tests of the respective crankshaft type may be taken into consideration for determining the highly loaded region or the most highly loaded point.

The respective highly loaded regions or the respective most highly loaded points of the transition radii may differ in the individual transition radii of a crankshaft. The highly loaded re-ion or the most highly loaded point may however also correspond in all transition radii, in particular in one type of transition radii. The highly loaded region or the most highly loaded point may possibly correspond in all transition radii firstly between connecting-rod bearing journals and crank webs and secondly between main bearing journals and crank webs.

The same also applies to the one or more intermediate regions and to the lightly loaded region.

The highly loaded region may basically have any desired size, for example may also be smaller than ±20° or greater than ±90°, proceeding from the bottom dead center of the connecting-rod bearing journal or the most highly loaded point of the main bearing journal.

In one refinement of the invention, it may in particular be defined that the most highly loaded point (in particular with respect to torsion) of a transition radius of a main bearing journal lies, in the cross section of the crankshaft, at the point of intersection of the transition radius of the main bearing journal with the connecting line of the central points of the main bearing journal and of the connecting-rod bearing journal adjoining the transition radius of the main bearing journal.

The most highly loaded point of a transition radius of a main bearing journal may be arranged on a side of the crankshaft averted from the bottom dead center of an adjoining connecting-rod bearing journal.

In one refinement of the invention, provision may be made whereby the impact hardening is performed in such a way that the impressions of an impact head of at least one impact tool overlap in a defined manner along the respective transition radius running in annularly encircling fashion around the crankshaft (in particular around the connecting-rod bearing journal and/or main bearing journal).

By means of overlapping impact impressions and/or closely arranged and exactly defined impact positions, a particularly effective increase in the fatigue strength or bending fatigue strength and torsional fatigue strength can be achieved.

In one refinement of the invention, provision may furthermore be made whereby the impact head of the at least one impact tool introduces the impact force into the transition radius at an adjustable impact angle.

The highly loaded region, the intermediate regions and/or the lightly loaded region may also relate to the circumference of the transition radius itself and not only to the circumference of the respective journal around which the transition radius runs in annularly encircling fashion. The loading of a transition radius may likewise vary along the circumference of the transition radius.

From this aspect, the impact angle is selected such that the impact force is introduced at an angle which is exactly adapted to the most highly loaded point during the operation of the crankshaft or the loading maximum, taking into consideration the bending loading and torsional loading, in relation to the circumference of the transition radius.

In one particular variant of the invention, for this purpose, provision may be made whereby, for the impact hardening, an impact device is used which has an impact piston, a deflecting unit and the at least one impact tool, wherein the at least one impact tool is fastened to the deflecting unit, and wherein the impact piston transmits an impulse via the deflecting unit to the at least one impact tool, following which the impact head of the at least one impact tool introduces the impact force into the transition radius at the impact angle, and wherein the impact angle is set through adjustment of the spacing between a deflecting point of the deflecting unit and the front end of the impact head of the at least one impact tool.

For this purpose, an impact piston may be used which transmits an intense pulse or an impulse (generated for example pneumatically, hydraulically and/or electrically) to the impact head.

Depending on the impact force, visible impact impressions of the impact head are formed at the respective impact positions. The depth of the impact impressions and the quality or the depth effect of the introduced internal compressive stresses are in this case dependent on the selected impact force. The tool and the process parameters are preferably exactly coordinated with the respective crankshaft and, here, if appropriate, with partial geometrical changes (changes in cross section).

The impact force in turn can, through variation of the impact angle, be individually set or aligned even more exactly to or with the loading maximum.

The deflection point may be the central point of the deflecting unit and/or the axis of rotation/mounting of the impact tool or of the impact tools.

The front end of the impact head means that part (or that surface) of the impact head with which the impact head impacts against the crankshaft for the purposes of impact hardening.

By means of the spacing between the deflection point and the front end of the impact head, it is also possible to adjust the spacing between the deflection point and the central point of the impact head or the spacing between the deflection point and the rear end of the impact head.

By virtue of the fact that the spacing between the deflection point of the deflecting unit and the impact head of an impact tool is adjustable, the angle at which the impact force is introduced into the transition radius can be varied or adjusted.

The particular variant of varying the spacing between a deflection point of the deflecting unit and the front end of the impact head of the at least one impact tool thus makes it possible for the impact force to be introduced at a preferred point and at a preferred angle.

By contrast, with the methods and apparatuses of the known prior art, it is only possible to introduce the impact force at a predefined fixed angle into the transition radii. An impact angle of approximately 45° is normally provided for this purpose.

Depending on the use of the crankshaft, it may be advantageous to select a different angle rather than a fixed impact angle of 45°, for example.

The most highly loaded location of the crankshaft is generally determined from the operation of the engine, and/or is determined by means of mathematical models. For new consideration approaches, the maximum loads from uniaxial loading and from biaxial superposed loading are considered for this purpose.

Through the adjustment of the impact angle, highly precise working and impact hardening can be ensured. By virtue of the fact that the impact forces can be introduced in targeted fashion into a loading maximum of the transition radius along the circumference of the transition radius and along the transition radius running in annularly encircling fashion around the crankshaft, and said impact forces run at an optimum angle, the impact force can possibly be reduced, whilst the attainable fatigue strength effect remains unchanged. The apparatus is thus even more efficient.

Depending on the application, through the targeted introduction of the impact forces, the fatigue strength of the crankshaft can even proceeding from the present possibilities in the prior art be increased yet further, should this be necessary.

In one embodiment of the invention, provision may be made whereby the length of the at least one impact tool is adjustable, preferably in telescopic fashion.

For this purpose, the impact tool may be designed in the manner of a telescopic rail or have a telescopic extension means. The at least one impact tool may also be designed as a telescopic tube. The invention is self-evidently not to be understood as being restricted to a particular type of telescopic extension means or to a particular type of telescopic capability.

The length of the at least one impact tool may for example also be adjusted by means of a thread.

Provision may be made whereby the length of the at least one impact tool is adjustable manually and/or by actuator means. For example, an electric motor, in particular a linear drive, may be provided for this purpose. The electric motor may however basically be any electric motor, for example a three-phase motor, an AC motor, a DC motor or a universal motor. A stepper motor may preferably be used.

In one embodiment of the invention, a changeover device with a magazine may be provided in order to exchange the at least one impact tool and/or the at least one impact head and/or the deflecting unit and/or the impact device in order to adjust the spacing between the deflection point of the deflecting unit and the front end of an impact head of the at least one impact tool to a different value.

It is known that, owing to the high impact forces, high mechanical loads act on the components of the impact device. In particular in the case of filigree components being used for adjusting the length of the at least one impact tool, the service life of the impact device or of the components thereof can be restricted in this way. If a magazine or a changeover device is provided for the at least one impact tool and/or the impact head and/or the deflecting unit and/or the impact device, the impact device or the apparatus as a whole can be of particularly robust design, because a telescopic movement of the at least one impact tool can possibly be omitted.

The spacing between the deflection point of the deflecting unit and the impact head of the at least one impact tool can thus be advantageously adjustable by means of the changeover device with the magazine, by virtue of components of the impact device being exchanged for the purposes of the length adjustment.

Provision may also be made whereby the spacing between the deflection point of the deflecting unit and the front end of an impact head of the at least one impact tool is adjustable through the use of distancing rings or spacers with different dimensions.

In one embodiment of the invention, two or more impact devices may be provided, wherein the spacing between the deflection point of the deflection device and the front end of the impact head of a first impact device is not identical to the spacing between the deflection point of the deflection device and the front end of the impact head of a second impact device.

It is thus possible to provide multiple impact tools which can be used independently of one another, in particular through the use of multiple impact devices with in each case one or more impact tools, which are capable of introducing respective impact forces into any transition radii of the crankshaft, wherein a corresponding synchronization with one another or between controllers of the impact tools may be provided. The impact hardening of the crankshaft can thus also be performed particularly quickly, because multiple impact devices can be used simultaneously.

In one embodiment of the invention, provision may be made whereby the at least one impact device has two impact tools, wherein the impact tools are arranged on the deflecting unit such that each impact tool is assigned to one transition radius.

Provision may be made whereby two impact tools are used in a common impact device, which impact tools preferably introduce impact forces simultaneously into both transition radii of a connecting-rod bearing journal or of a main bearing journal.

This also applies for transitions to flanges, journals and other geometrical changes in cross section both for tangential and undercut radii.

The impact tools may preferably be operated by a common impact piston.

In the case of multiple impact tools (and/or impact devices) being used, a common pressure pulse device may be provided which is capable of generating the corresponding impact forces for the impact tools by hydraulic, pneumatic, mechanical and/or electrical means (jointly or individually) for the impact tools.

In the case of multiple impact devices being used, provision may be made whereby the respective spacings between the deflection points and the impact heads are identical in all impact tools or differ from one another in at least two impact tools. It is preferable if the respective spacings between the deflection point of the deflecting unit and the impact heads of two impact tools for the hardening of transition radii that adjoin the same journal are identical.

In one embodiment of the invention, provision may be made whereby the impact angle between the longitudinal axis of the at least one impact tool and a line perpendicular to the longitudinal axis of the crankshaft amounts to 5° to 80°, preferably 10° to 70°, more preferably 20° to 60° and particularly preferably 30° to 55°, in particular 35° to 50°.

Preferably, an impact angle of 45° may be provided, in particular if the loading maximum is not known exactly.

For example, provision may be made whereby an impact head has a radius of which the magnitude amounts to 75% to 99% of the transition radius, preferably 85% to 98% of the transition radius and particularly preferably 85% to 95% of the transition radius.

The radius of the impact head may however also be less than 75% of the transition radius or greater than 95% of the transition radius. The radius of the impact head may also correspond to the transition radius.

The impact head may preferably be of substantially spherical form, in particular in the front region or at the front end of the impact head, which impacts against the crankshaft for the purposes of hardening. The impact head may however basically have any desired geometry, and may for example also be of oval, hemispherical or flat form.

In one embodiment of the method, provision may be made whereby the impact angle is selected in accordance with the profile of a loading maximum of the transition radius, wherein the profile of the loading maximum is determined on the basis of simulations and/or calculations and/or series of tests of the respective crankshaft type.

The highly loaded regions of the crankshaft along the circumference of the transition radius are also preferably identified in advance. By means of the device according to the invention and/or the method according to the invention, the impact force can then be introduced in targeted fashion into the corresponding loading maxima. By taking into consideration the individual demands on different crankshaft types and intended uses of the crankshafts, the crankshaft can be impact-hardened with particularly high precision through the adjustment of the spacing between deflection point of the deflecting unit and the front end of an impact head of the at least one impact tool.

Through the adjustment of the spacing, not only the impact point but also the impact direction can be defined. In this way, crankshafts can be produced whose fatigue strength, in particular bending and torsional fatigue strength, is further optimized. Alternatively, by means of the precision which is now available, an existing fatigue strength can be attained simply through the use of lower impact forces.

In one embodiment of the invention, provision may be made whereby all transition radii between the connecting-rod bearing journals and the crank webs and/or all transition radii between the main bearing journals and the crank webs are impact-hardened at the same impact angle.

It is also possible for all transitions to flanges, journals and/or other geometrical changes in cross section—both for tangential and undercut radii—to be impact-hardened at the same impact angle.

Provision may therefore be made whereby all transition radii of the crankshaft are impact-hardened at the same impact angle, wherein the impact angle selected for this purpose is optimized with regard to the highly loaded region or the most highly loaded point of the crankshaft.

Provision may however also be made whereby all transition radii of the connecting-rod bearing journals are impact-hardened at a first impact angle and all transition radii of the main bearing journals are impact-hardened at a second impact angle, wherein the first and the second impact angle are optimized correspondingly to the respectively most highly loaded locations and/or the profile of the loading maximum.

In an alternative embodiment of the invention, provision may be made whereby at least two transition radii between the connecting-rod bearing journals and the crank webs are impact-hardened at a different impact angle and/or whereby at least two transition radii between the main bearing journals and the crank webs are impact-hardened at a different impact angle and/or whereby at least one transition radius between the connecting-rod bearing journal and the crank webs is impact-hardened at a different impact angle than a transition radius between the main bearing journals and the crank webs.

The impact angles can thus be defined or optimized individually for each transition radius or for groups of transition radii.

For example, different impact angles can be used simultaneously at one journal location.

In one embodiment of the invention, provision may finally also be made whereby the impact angle is varied during the impact hardening of a transition radius running in annularly encircling fashion around the connecting-rod bearing journal and/or the main bearing journal.

This self-evidently also applies for transitions to flanges, journals and/or other geometrical changes in cross section both for tangential and undercut radii.

It has been found that a further increase in the fatigue strength or bending fatigue strength and/or torsional fatigue strength can be achieved in this way.

For example, a different impact angle may be provided in the region of the bottom dead center of a connecting-rod bearing journal, or in the region of the most highly loaded point of a main bearing journal, than in the remaining region of the transition radius.

In particular if provision is made whereby the impact angle is varied by actuator means during the impact hardening of a transition radius, an open-loop and/or closed-loop control device, preferably comprising a microprocessor, may be provided in order to activate the corresponding actuator arrangement.

Instead of a microprocessor, provision may also be made of any other device for implementing an open-loop and/or closed-loop control device, for example one or more arrangements of discrete electrical components on a circuit board, a Programmable Logic Controller (PLC), an Application-Specific Integrated Circuit (ASIC) or some other programmable circuit, for example also a Field Programmable Gate Array (FPGA), a Programmable Logic Arrangement (PLA) and/or a commercially available computer.

In a further particular variant of the invention, provision may be made whereby, for the impact hardening, the crankshaft is firstly rotated by means of a drive device along a direction of rotation into an impact position, wherein an arresting device is provided in order to arrest the crankshaft in the impact position, following which an impact force is introduced into at least one transition radius by means of at least one impact tool.

In this way, (parasitic) shear stresses are substantially, if not even entirely, prevented.

By virtue of the fact that the rotational movement of the crankshaft is stopped in the impact position not by the impact tool itself but by the drive device, the demands on the mechanical components of the drive device, and possibly even the service life of the drive device, are improved. By means of the arresting device, it is furthermore possible for the impact force to be introduced in a particularly targeted manner into the desired region. This is possible because the crankshaft cannot rotate along or counter to the rotational direction in an undesired manner upon the impacting of the impact tool.

Through the use of the arresting device, it is thus possible to ensure highly precise working or impact hardening. The impact spacings can be implemented in a very particularly targeted manner and with small tolerances.

An arresting device may be a device which arrests the crankshaft in preferably non-positively locking and/or positively locking fashion, or engages with this aim into the drive train or into the apparatus. A non-positively locking arresting means is preferably provided, wherein the arresting force is selected such that a rotation of the crankshaft during the introduction of the impact force is prevented or at least suppressed.

The arresting device may be a hydraulically, pneumatically and/or electrically operated arresting device.

The arresting device preferably has one or more brake shoes, for example two brake shoes, three brake shoes, four brake shoes or more brake shoes.

The arresting device is preferably attached to the workpiece drive unit. For example, the arresting device may be arranged on a jaw chuck or a clamping flange, a fastening flange or a face plate of the workpiece drive device, or directly on the motor or the drive.

With a closed-loop position controller, a point-to-point movement of the crankshaft can thus be achieved. For example, an open-loop position controller may be used in order to rotate the crankshaft in stepped or clocked fashion from one impact position to the next impact position. In the simplest case, an open-loop PTP controller or point controller may be provided for this purpose.

The drive device may comprise a motor, in particular an electric motor. The electric motor may basically be any electric motor, for example a three-phase motor (in particular a three-phase asynchronous machine), an AC motor, a DC motor or a universal motor.

A stepper motor may preferably be used.

It is also possible for a two-part drive device to be provided, in the case of which, for example, a motor is provided at each end of the crankshaft, that is to say a synchronous drive or bilateral drive of the crankshaft.

In one embodiment of the invention, provision may be made whereby the controller of the drive device and the controller of the arresting device are synchronized with one another such that the arresting device arrests the crankshaft only when the crankshaft is at a standstill in the impact position.

The arresting device may basically also, in the case of a corresponding design, for example in the case of a design based on non-positive locking, be used for braking the rotational movement of the crankshaft. It is however particularly preferable to use the arresting device only for arresting the crankshaft in the impact position, whereby the dynamics or rotation of the crankshaft is influenced only by the drive device. That is to say, a torque that leads to an acceleration of the crankshaft (or to braking) should preferably be introduced exclusively by the drive device. For example, the controller of the drive device (for example a closed-loop position controller) and/or the controller of the arresting apparatus can be of particularly simple construction. It may thus suffice to merely synchronize the points in time at which the drive device and arresting device act on the crankshaft through corresponding time management. The drive device and the arresting device thus preferably do not act on the crankshaft simultaneously.

In one embodiment of the invention, provision may furthermore be made whereby the controller of the arresting device and the controller of the at least one impact tool are synchronized with one another such that the at least one impact tool introduces the impact force into the at least one transition radius of the crankshaft only when the crankshaft has been arrested in the impact position.

Undesired shear stresses can be prevented entirely in this way.

It is however basically also possible for the introduction of the impact force to begin already when the crankshaft has not yet been fully arrested in the impact position.

The synchronization of the controllers of the drive device, arresting device and/or of the at least one impact tool may also be performed such that the points in time or time ranges in which the individual components act on the crankshaft at least partially overlap. Faster timing of the entire method can be achieved in this way.

In one embodiment of the invention, provision may be made whereby the drive device is designed as a direct drive.

A drive device without a clutch is preferably provided.

In the present case, a direct drive is to be understood to mean drives in the case of which the motor, preferably an electric motor, and the driving shaft are connected or coupled directly or without a transmission ratio. In particular, a transmission is omitted.

When using the variant according to the invention, it is also preferably possible to omit a clutch, in particular a slipping clutch. A slipping clutch, used inter alia for protecting components, is provided for example in the method according to EP 1 716 260 B1 in order that the drive device or the apparatus is not damaged upon the forced stop of the crankshaft as a result of the impacting of the impact head. Such damage is ruled out in the case of the method described here, whereby the slipping clutch can be rendered unnecessary.

In this way, the construction of the drive device is very particularly simple and thus economical.

In one embodiment of the invention, provision may be made in particular whereby the arresting device and the drive device are arranged separately from one another.

The arresting device is preferably not designed as a brake arrangement within the drive device, which may be required for example for the closed-loop position control. Normally, in a drive device that comprises an electric motor and performs point-to-point operation by means of a closed-loop position controller, no brake arrangement is provided in any case, because the torques are generated through closed-loop voltage and/or current control of the electric motor. Should the drive device however comprise a conventional brake device, provision may possibly be made whereby the arresting device is provided in addition to this and is designed as an assembly independent thereof.

The arresting device may basically also be arranged separately within the drive device. In this case, too, these are preferably mutually independent components which are spatially separate and/or functionally independent.

In an alternative embodiment, which is not preferred, a brake device of the drive device may be used. For this purpose, said brake device must be suitably designed in order that the crankshaft does not rotate during the introduction of the impact force.

In one embodiment of the invention, provision may furthermore be made whereby the arresting device arrests the crankshaft indirectly by virtue of the arresting device arresting a rotatable fastening device, preferably a fastening flange or a clamping flange of the fastening device, to which flange or fastening device the crankshaft is fixed.

Instead of the fastening flange or in addition to the fastening flange, the fastening device may also comprise a face plate or some other clamping means.

In particular, a face plate with multiple clamping jaws, for example two, three, four, five, six or more clamping jaws, may be provided. In this way, crankshaft types with different diameters can be fixed.

The crankshaft is, for the processing thereof, commonly rotatably fixed by means of a fastening device to a drive shaft.

In order to arrest the crankshaft in its impact position, the arresting device may basically engage at any desired position that is mechanically coupled to the drive device or to the crankshaft. For example, the arresting device may engage on the crankshaft itself, may engage within the drive device for example on the drive shaft, may engage outside the drive device for example on the drive shaft, or may particularly preferably engage on the fastening device, in particular on a fastening flange or on a face plate or some other clamping means.

In one embodiment, provision may be made in particular whereby the arresting device engages on the fastening device or on the fastening flange or on the face plate or on the clamping flange in the region of an outer circumference.

By virtue of the fact that the arresting device engages in the region of an outer circumference of a plate or shaft, the arresting forces which must be imparted, or which are required, can be lower. Depending on the radial position of the arresting device in relation to the axis of rotation of the drive shaft, correspondingly less force is required to block a torsional moment the greater the radial spacing to the axis of rotation is. It is particularly advantageous here if the arresting device engages only when the crankshaft is already at a standstill in the impact position.

The arresting device may basically also engage on multiple locations. For example, provision may be made whereby the arresting device engages on in each case one suitable location in the region of both ends of the crankshaft, for example on fastening flanges situated there.

A support in the manner of a tailstock may also be provided in order to rotatably support or fix the crankshaft at its end averted from the drive device.

The arresting device may then for example engage in the region of the drive device or drive shaft and/or in the region of the support. It is preferable in this case, too, for the arresting device to engage on the fastening device, preferably a fastening flange, as described.

In one embodiment of the invention, provision may be made whereby the arresting device is designed to prevent rotation of the crankshaft counter to and/or in the direction of rotation of the crankshaft.

In particular if the impact impressions of an impact head along the respective transition radius running in annularly encircling fashion around the journal are intended to overlap, that is to say if the impact positions are closely spaced apart, then it is necessary for the impact force to be introduced in a highly precise and targeted manner. Without the use of an arresting device, this is difficult because, during the introduction of the impact force, the crankshaft would at least partially rotate back from one impact position into the previous impact position if the impact head penetrates into the impact impression of the previous impact. Since it has been found that a particularly effective increase in fatigue strength or flexural fatigue strength and torsional fatigue strength can be generated by means of overlapping impact impressions or closely arranged and exactly defined impact positions, the invention is particularly advantageous in combination with the introduction of closely positioned and/or precise impact spacings, in particular such that the impact impressions overlap or intersect.

In one embodiment of the invention, the at least one impact tool can perform an impact movement, or introduce the impact force, with a periodicity, preferably with a timing or impact frequency of 0.5 Hz to 30 Hz, particularly preferably with a timing of 0.5 Hz to 5 Hz and very particularly preferably with a timing of 0.5 Hz to 3 Hz.

Other timings, for example also impact frequencies between 0.1 Hz and 50 Hz, may self-evidently also be provided, but the values stated above are very particularly suitable.

The impact pressures that can be implemented by the impact piston to generate the impact force may—depending on the operating mode—amount to between 10 and 300 bar, preferably between 30 and 180 bar, and particularly preferably between 50 and 130 bar.

The temperature in the region of the crankshaft segment or transition radius to be machined should preferably be no higher than 65° C.; values between 12° C. and 25° C. are preferred.

It has been found from experience that micro-cracks, which are not capable of propagating, can form in the surface of crankshafts after dynamic loading in the engine or on the test stand. These micro-cracks have no effect on the fatigue strength characteristics but they can impair the visual appearance.

Since the introduction of internal compressive stresses can be performed preferably to a depth of 15 mm or else even deeper, this means that a removal of a few millimeters, for example of 0.1 to 3 mm, preferably 0.5 mm, can be performed in the surface region of the crankshaft without the flexural and torsional fatigue strength, or the fatigue strength, of the crankshaft being adversely affected.

Tests have shown that such measures can even slightly increase the fatigue strength, for example by up to 5%.

The removal of the surface may be performed in various ways, for example by grinding, turning, milling, rotary milling, peeling or polishing.

The impact hardening of a transition radius may also be performed in encircling fashion several times around the crankshaft or the journal. Provision may thus also be made for impact hardening in accordance with the invention to be performed on regions that have already been impact-hardened in accordance with the invention. Here, the regions (that is to say the highly loaded region, the lightly loaded region and/or the intermediate regions) may partially overlap or be defined over an angle segment greater than 360°. The regions may be defined for example over an angle segment of 540°, 720°, 900°, 1080° or more.

Provision may be made for the impact hardening to be commenced in the lightly loaded region (or in an intermediate region if no impact hardening is performed in the lightly loaded region) and for the impact force to be increased proceeding from said region in the direction of the highly loaded region.

For example, provision may be made for impact hardening to firstly be performed with a first impact force over 360° around the annularly encircling transition radius, and for impact hardening to subsequently be performed with a second impact force, which may also be identical to the first impact force, in the intermediate regions and the highly loaded regions, and for impact hardening to be performed with a third impact force, which may also be identical to the first and/or second impact force, in the highly loaded region in a third revolution. The impact force may thus basically also be increased, for example proceeding from the intermediate regions in the direction of the highly loaded region, by virtue of impact forces being introduced in multiple revolutions into the annularly encircling transition radius. The impact force may thus also be introduced as the sum of multiple individual impact forces.

The invention also relates to an apparatus for carrying out an above-described method for the impact hardening of transition radii of a crankshaft, in particular of transition radii between connecting-rod bearing journals and crank webs and/or transition radii between main bearing journals and the crank webs of the crankshaft.

The apparatus is also suitable for the impact hardening of transitions to flanges, journals and other geometrical changes in cross section both for tangential and undercut radii.

Features that have already been described in conjunction with the method according to the invention are self-evidently also advantageously implementable for the apparatus according to the invention, and vice versa. Furthermore, advantages that have already been mentioned in conjunction with the method according to the invention can also be understood as relating to the apparatus according to the invention, and vice versa.

Provision may be made whereby two impact tools are used in a common impact device, which impact tools introduce impact forces simultaneously into both transition radii of a connecting-rod bearing journal or of a main bearing journal. The impact tools may be coupled by means of a deflecting unit and thus preferably operated by a common impact piston.

It is also possible to provide multiple impact tools which can be used independently of one another (for example through the use of multiple impact devices with in each case one or more impact tools), which are capable of introducing a respective impact force into any transition radii of the crankshaft, wherein a corresponding synchronization with one another or between the controllers of the drive device and/or arresting device and/or further impact tools may be provided.

Provision may also be made for only one impact tool to be used.

In one embodiment of the invention, provision may be made whereby the drive device and the arresting device are formed and arranged separately from one another.

In one embodiment, it is furthermore possible for a rotatable fastening device to be provided in order to fix the crankshaft, wherein the arresting device is arranged and designed to arrest the fastening device for the crankshaft.

In one embodiment of the invention, provision may furthermore be made whereby the fastening device has a fastening flange which is arrestable by means of the arresting device, preferably by virtue of the arresting device engaging on the fastening flange in the region of an outer circumference.

In one embodiment, provision may also be made whereby the drive device is arranged and designed to rotate the fastening device, preferably to rotate said fastening device about an input shaft of the fastening device. The input shaft of the fastening device may be an output shaft of the drive device, for example of an electric motor.

The fastening device may preferably be arranged between an output shaft of the drive device and the crankshaft.

In one embodiment of the invention, an open-loop and/or closed-loop control device, preferably comprising a microprocessor, may be provided in order to realize and/or synchronize the rotational movement of the drive device and/or the control of the arresting device and/or the control of the at least one impact tool.

An open-loop and/or closed-loop control device may be provided which comprises the controllers of the arresting device, of the drive device and/or of the at least one impact tool.

Instead of a microprocessor, provision may also be made of any other device for implementing an open-loop and/or closed-loop control device, for example one or more arrangements of discrete electrical components on a circuit board, a Programmable Logic Controller (PLC), an Application-Specific Integrated Circuit (ASIC) or some other programmable circuit, for example also a Field Programmable Gate Array (FPGA), a Programmable Logic Arrangement (PLA) and/or a commercially available computer.

The invention also relates to a computer program with program code means for carrying out the method according to the invention when the program is executed on an open-loop and/or closed-loop control device, in particular on a microprocessor.

Some of the components of the apparatus according to the invention may basically correspond in terms of their construction to the apparatus according to EP 1 716 260 B1, for which reason the content of disclosure of EP 1 716 260 B1 is, in its entirety, integrated into the present disclosure by reference.

The invention also relates to a crankshaft produced in accordance with a method described above.

The crankshaft according to the invention differs from conventional crankshafts in particular in that, for the hardening thereof, impact forces have been introduced with different intensities in different regions into at least one of the transition radii along the respective annularly encircling transition radius. Furthermore, the crankshaft according to the invention may differ from conventional crankshafts because possibly more than one impact angle has been used for the hardening thereof, giving rise, overall, to characteristic hardening of the transition radii of the crankshaft.

BRIEF DESCRIPTION OF THE FIGURES

Exemplary embodiments of the invention will be described in more detail below on the basis of the drawing.

The figures each show preferred exemplary embodiments, in which individual features of the present invention are illustrated in combination with one another. Features of an exemplary embodiment are also implementable separately from the other features of the same exemplary embodiment, and may accordingly be readily combined by a person skilled in the art with features of other exemplary embodiments in order to form further meaningful combinations and sub-combinations.

In the figures, functionally identical elements are denoted by the same reference designations.

In the figures, in each case schematically:

FIG. 1 shows an overall view of an apparatus according to the invention for carrying out the method in a first embodiment;

FIG. 2 shows a perspective view of a part of the apparatus according to the invention for carrying out the method in a second embodiment;

FIG. 3 shows an impact device with two impact tools in an enlarged illustration as per the detail "A" from FIG. 1;

FIG. 4 shows an impact device with only one impact tool;

FIG. 5 shows an exemplary detail of a crankshaft;

FIG. 6 shows a section through the crankshaft of FIG. 5 in accordance with the section line VI;

FIG. 7 shows an exemplary division of an annularly encircling transition radius into a highly loaded region, a lightly loaded region and interposed intermediate regions of an exemplary journal;

FIG. 8 shows an exemplary distribution of impact forces along a transition radius, running in annularly encircling fashion around a journal, in a first embodiment;

FIG. 9 shows an exemplary distribution of impact forces along a transition radius, running in annularly encircling fashion around a journal, in a second embodiment;

FIG. 10 shows an exemplary distribution of impact forces along a transition radius, running in annularly encircling fashion around a journal, in a third embodiment;

Figure 11:
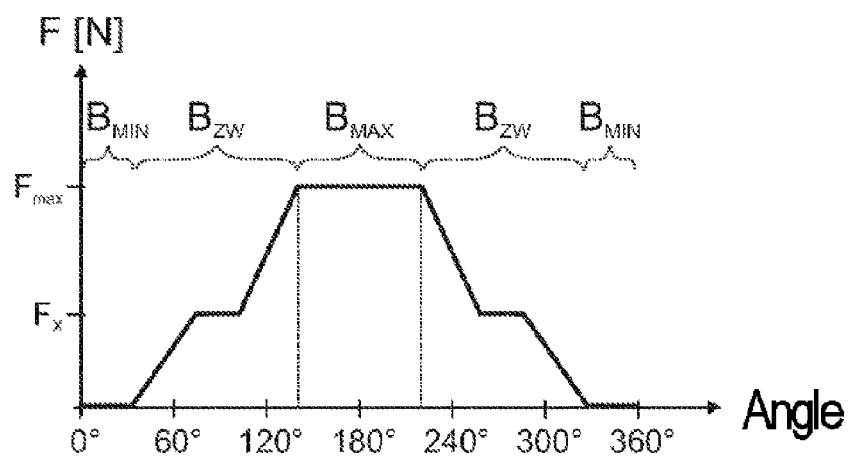
Figure 12:
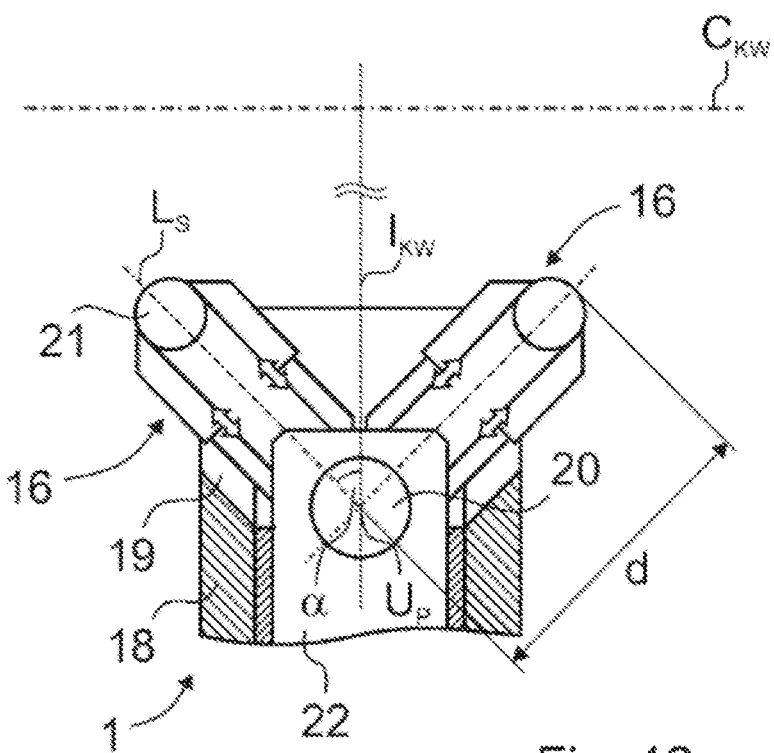
Figure 13:
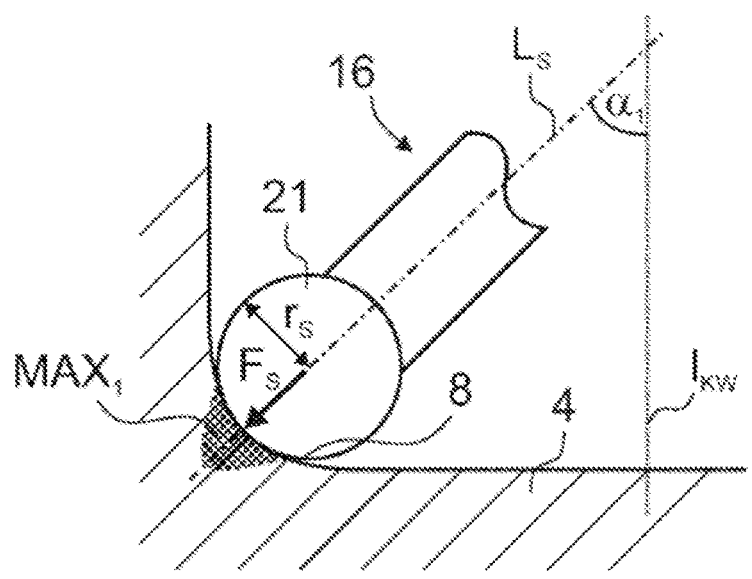
Figure 14:
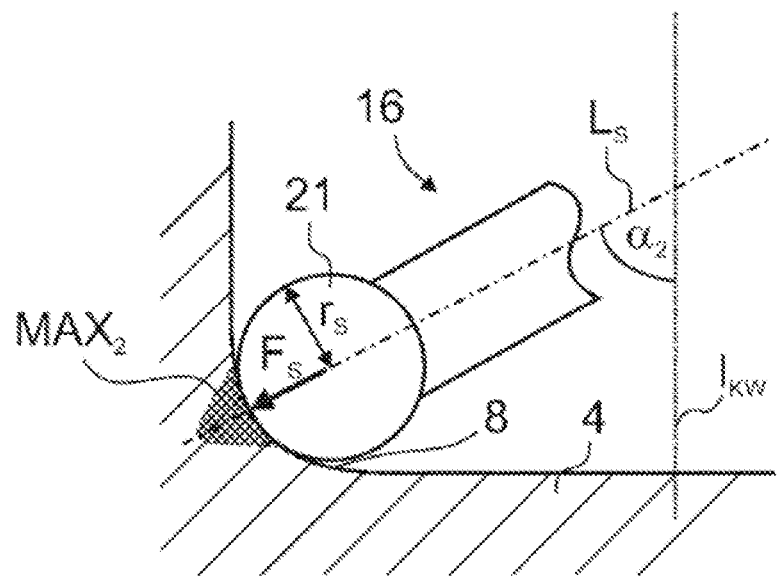
Figure 15:
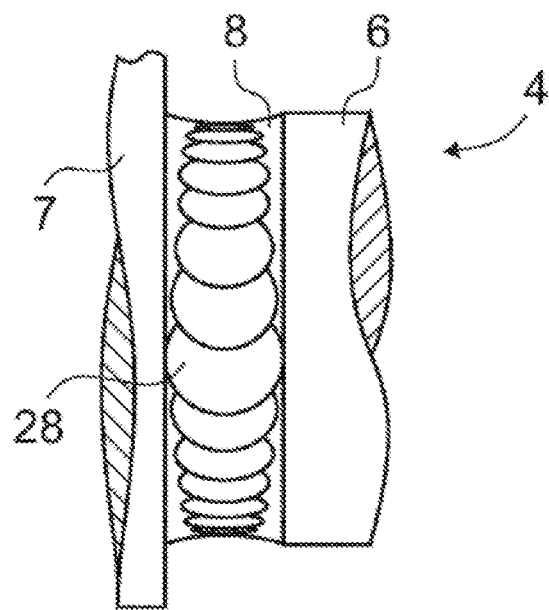
Figure 16:
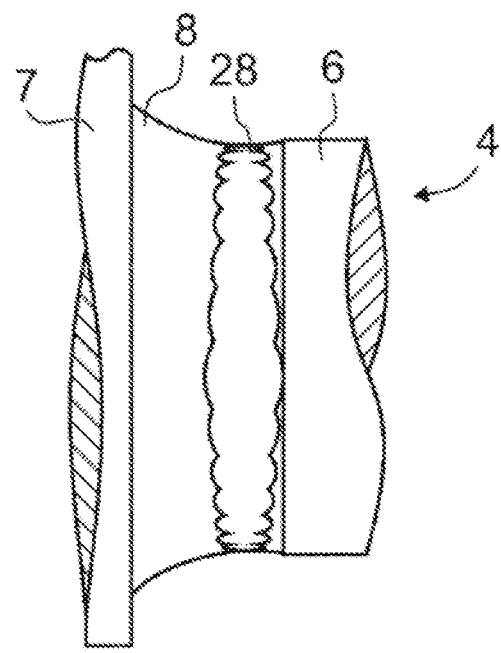
Figure 17:
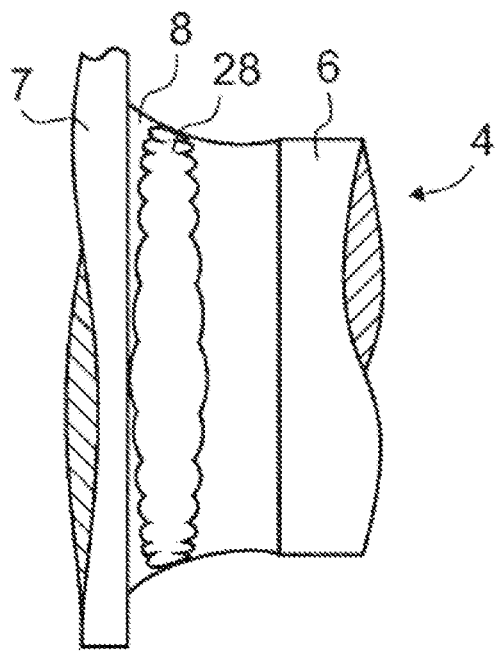
Figure 18:
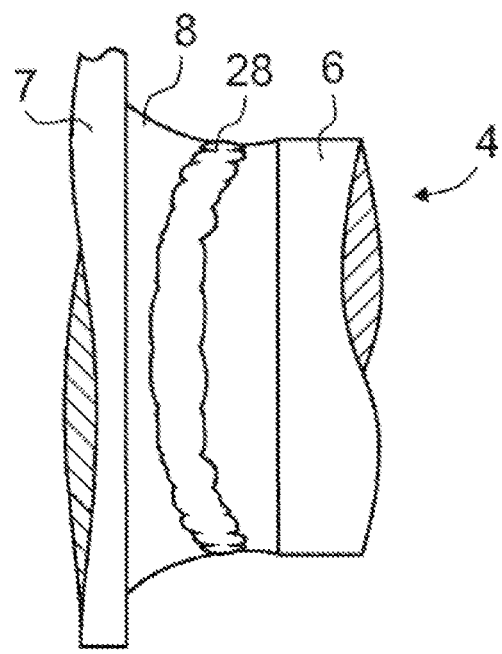
Figure 19:
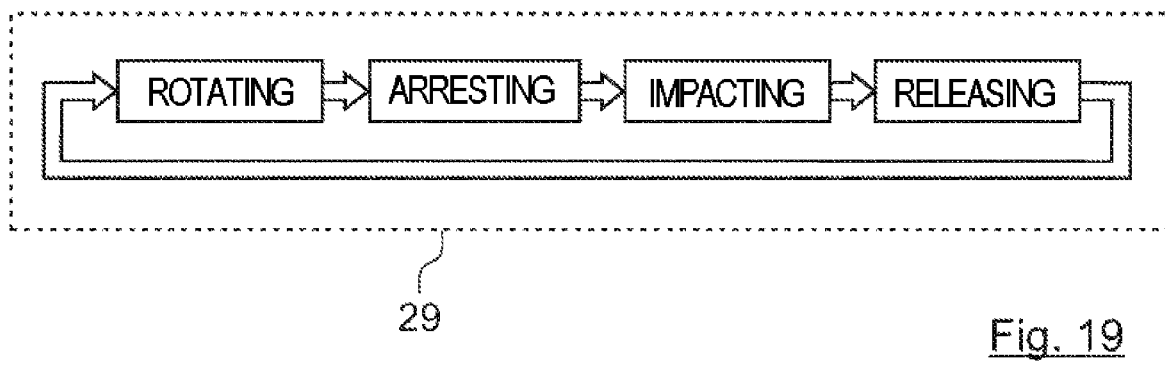

FIG. 11 shows an exemplary distribution of impact forces along a transition radius, running in annularly encircling fashion around a journal, in a fourth embodiment;

FIG. 12 shows an impact device with two telescopic impact tools;

FIG. 13 is an enlarged illustration of a transition radius and of an impact tool with an impact head, wherein the impact tool is aligned at a first impact angle;

FIG. 14 is an enlarged illustration of a transition radius and of an impact tool with an impact head, wherein the impact tool is aligned at a second impact angle;

FIG. 15 shows an impact-hardened transition radius in the case of which impact impressions of an impact head overlap along the annularly encircling transition radius;

FIG. 16 shows an impact-hardened transition radius in the case of which a first impact angle has been used for the impact hardening;

FIG. 17 shows an impact-hardened transition radius in the case of which a second impact angle has been used for the impact hardening;

FIG. 18 shows an impact-hardened transition radius in the case of which the impact angle has been varied during the impact hardening along the annularly encircling transition radius; and FIG. 19 shows a flow diagram during the use of an arresting device.

DETAILED DESCRIPTION OF THE INVENTION

The apparatus illustrated in an overall view in FIG. 1 basically corresponds in terms of its construction to the apparatuses as per DE 34 38 742 C2 and EP 1 716 260 B1 with one or more impact devices 1, for which reason only the important parts, and the differences in relation to the prior art, will be discussed in more detail below.

The apparatus has a machine bed 2 and a drive device 3. The drive device 3 is used to move or rotate a crankshaft 4 along a direction of rotation into an impact position.

The crankshaft 4 has connecting-rod bearing journals 5 and main bearing journals 6, between which crank webs 7 are arranged in each case. Transition radii 8 (see FIGS. 3 to 5 and 13 to 18) are formed between connecting-rod bearing journals 5 and crank webs 7 and between main bearing journals 6 and crank webs 7, or generally between transitions in cross section of the crankshaft 4.

At that side of the crankshaft 4 which faces toward the drive device 3, there is provided a fastening device 9 which has a clamping disk or a fastening flange 10. On that side of the crankshaft 4 which is averted from the drive device 3, a support 11 preferably in the manner of a tailstock is provided, which has a further fastening device 9 for the purposes of rotatably receiving or rotatably fixing the crankshaft 4. Optionally or in addition to the support 11, a back rest may be provided which is positioned at a rotationally symmetrical location.

Furthermore, an arresting device 12 may be provided, which engages in the region of an outer circumference of the fastening device 9. This is illustrated by dashed lines in FIG. 1. Basically, the arresting device 12 may be arranged at any desired location within the apparatus in order to apply an arresting force to an output shaft of the drive device 3, or to an input shaft 13, which in the present case is identical to said output shaft, of the fastening device 9, and thus to the crankshaft 4. The arresting device 12 may also engage on multiple locations of the apparatus. By way of example, a second part of the arresting device 12 in engagement with the fastening device 9 in the region of the support 11 is likewise illustrated by dashed lines.

The arresting device 12 is based for example on a non-positive arresting action using a merely schematically illustrated brake shoe arrangement 14.

The drive device 3 is capable of setting the crankshaft 4 in rotation motion along an axis of rotation C. Provision may be made here whereby the main axis of rotation $C_{KW}$ of the crankshaft 4 is positioned eccentrically from the axis of rotation C of the drive device 3, as illustrated in FIG. 1 and FIG. 2. For this purpose, it is preferably possible for alignment means 17 (see FIG. 2) to be provided in the region of the fastening device 9. Here, provision may be made whereby the alignment means 17 displace a central axis of the journal 5, 6 that is respectively to be hardened such that the central axis of the journal 5, 6 lies on the axis of rotation C.

A direct drive, preferably without a clutch, may be provided for the drive device 3. A motor, preferably an electric motor, of the drive device 3 can thus be coupled without a transmission ratio or transmission to the fastening device 9 or to the crankshaft 4.

The impact devices 1 described in more detail by way of example below are each held adjustably in a displacement and adjustment device 15 in order to adapt them to the position of the connecting-rod bearing journals 5 and of the main bearing journals 6 and to the length of the crankshaft 4.

Figure 1:
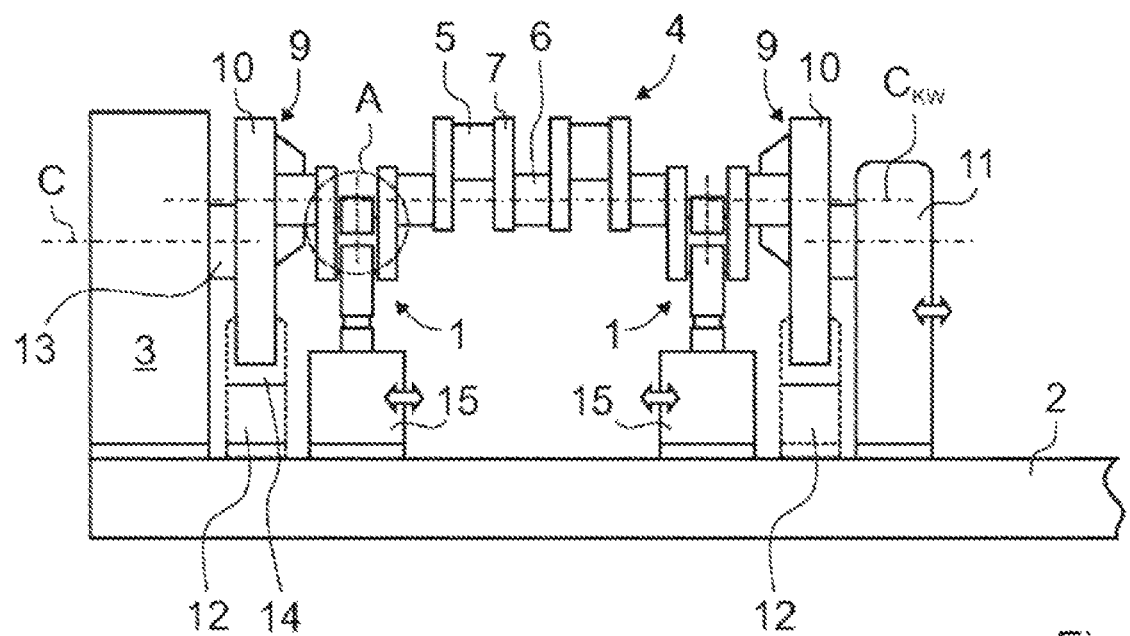
Figure 2:
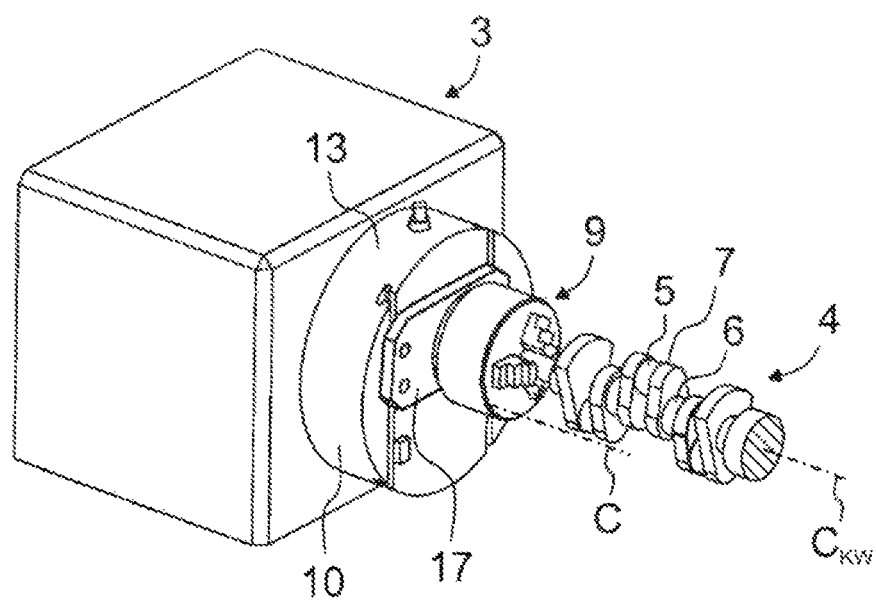

The support 11 may also be designed to be displaceable, as indicated by the double arrows in FIG. 1.

Two impact devices 1 are illustrated in FIG. 1, though basically any number of impact devices 1 may be provided, for example also only a single impact device 1.

Provision may also be made whereby at least one impact device 1 is designed and configured for the impact hardening of the transition radii 8 of the main bearing journals 6 and one impact device 1 is designed and configured for the impact hardening of the transition radii 8 of the connecting-rod bearing journals.

FIG. 2 illustrates, in a perspective view, a detail of a further apparatus for carrying out the method according to the invention but without an impact device. Here, the apparatus of FIG. 2 is substantially identical to the apparatus of FIG. 1, for which reason only the important differences will be referred to in detail below.

A drive device 3 is once again provided. Furthermore, a fastening device 9 is provided which has a fastening flange 10 and, fastened thereto, a face plate with clamping jaws for fixing the crankshaft 4. The face plate with the clamping jaws of the fastening device 9 is arranged on the fastening flange 10 adjustably on an alignment means 17, whereby the longitudinal axis $C_{KW}$ of the crankshaft 4 can be displaced relative to the axis of rotation C of a drive shaft or of an input shaft 13.

The crankshaft 4 of FIG. 2 has a configuration which deviates from the embodiment illustrated in FIG. 1, but basically likewise comprises connecting-rod bearing journals 5, main bearing journals 6 and crank webs 7.

In FIG. 2 (as in FIG. 1), a further fastening device 9 may be provided at that end of the crankshaft 4 which is averted from the drive device 3, though said further fastening device may also be omitted.

Figure 3:
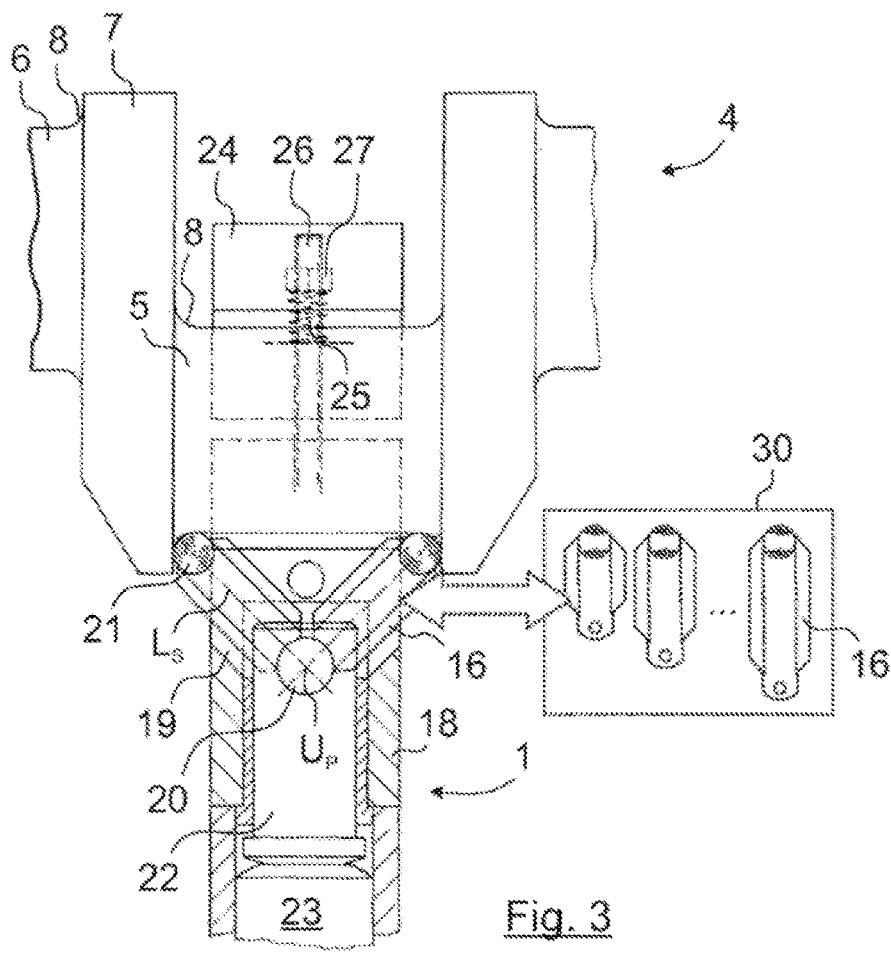

An impact device 1 of FIG. 1 is illustrated in more detail by way of example in FIG. 3. The invention may basically be implemented with any impact device 1. The impact device 1 described below is however particularly suitable. It has a main body 18 which may be provided with a prismatic abutment correspondingly to the radius of the crankshaft segment to be machined, and which preferably has guides 19 which guide two impact tools 16 in their support plane and provide them with a corresponding degree of freedom in terms of the support angle or impact angle α (see FIGS. 12 to 14) about a deflecting unit 20, which is advantageous for the adaptation to the dimensional conditions of the crankshaft 4. In each case one ball as impact head 21 is arranged at the front ends of the two impact tools 16. An intermediate part 22 produces the connection between an impact piston 23 and the deflecting unit 20, which transmits the impact energy to the impact tools 16. The intermediate part 22 may possibly also be omitted.

To increase the effectiveness of the impact, a clamping prism 24 may be fastened, via springs 25, by means of adjustable clamping bolts 26 with clamping nuts 27 to that side of the journal 5, 6 which is averted from the main body 18. Other structural solutions are also possible here.

It should be understood that, where a part of the description refers to "an impact head/impact tool" or "an impact device" or "multiple impact heads/impact tools/impact devices", this may basically mean any number of impact heads/impact tools/impact devices, for example two, three, four, five, six, seven, eight, nine, ten or more. The reference to a plurality or singularity is provided merely for the sake of better readability, and is not limiting.

By means of the arrangement of multiple impact devices 1 over the length of the crankshaft 4 to be machined, it is possible, as required, for all centrally and possibly eccentrically running regions of the crankshaft 4 to be machined simultaneously.

The impact piston 23 transmits an impulse to the impact tools 16 via the deflecting unit 20, whereby the impact heads 21 of the impact tools 16 introduce an impact force $F_S$ into the transition radii 8 at an impact angle α. Provision may be made here whereby the spacing d (cf. FIG. 12) between the deflection point $U_P$ of the deflecting unit 20 and the front end of the respective impact head 21 of the impact tools 16 is adjustable.

The expression "$F_S$" and similar expressions in the present description are to be understood merely as placeholders/variables for any impact force that appears appropriate to a person skilled in the art. Here, where the description refers to "the impact force $F_S$", this may thus refer in each case to different or else identical impact forces.

Figure 4:
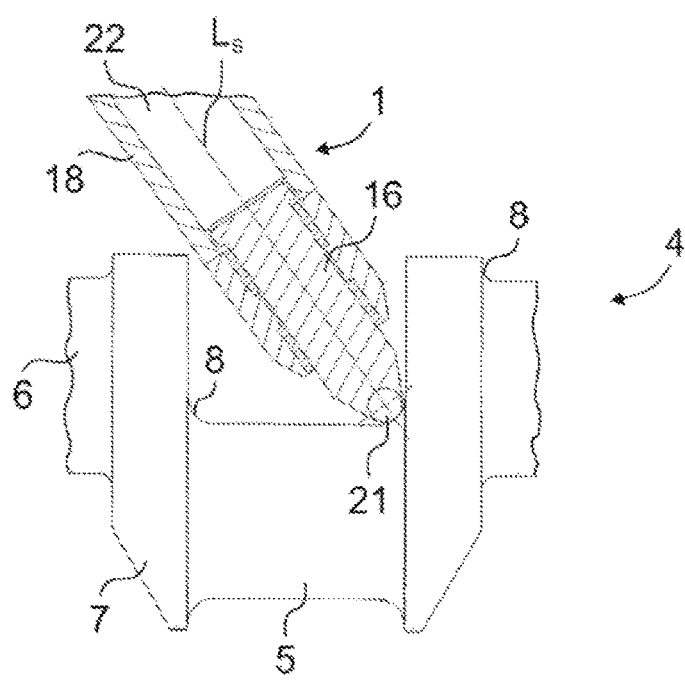

FIG. 4 shows an impact device 1 which is equipped with only one impact tool 16. In the exemplary embodiment shown, the impact device 1 is preferably inclined relative to the crankshaft 4, specifically such that the impact tool 16, which is arranged coaxially with respect to the longitudinal axis of the impact device 1, impacts perpendicularly against the region of the crankshaft segment to be machined, in the present case of the transition radius 8 to be machined. In this case, although it is possible for in each case only one crankshaft segment to be machined, the structural design and the transmission of force by the impact device 1 are on the other hand better and simpler. Bore ends can additionally be hardened by means of this tool in a standing position.

This embodiment has proven particularly advantageous for use on non-symmetrical crankshaft segments, such as the end regions and the oil bore ends of the crankshaft 4.

Figure 5:
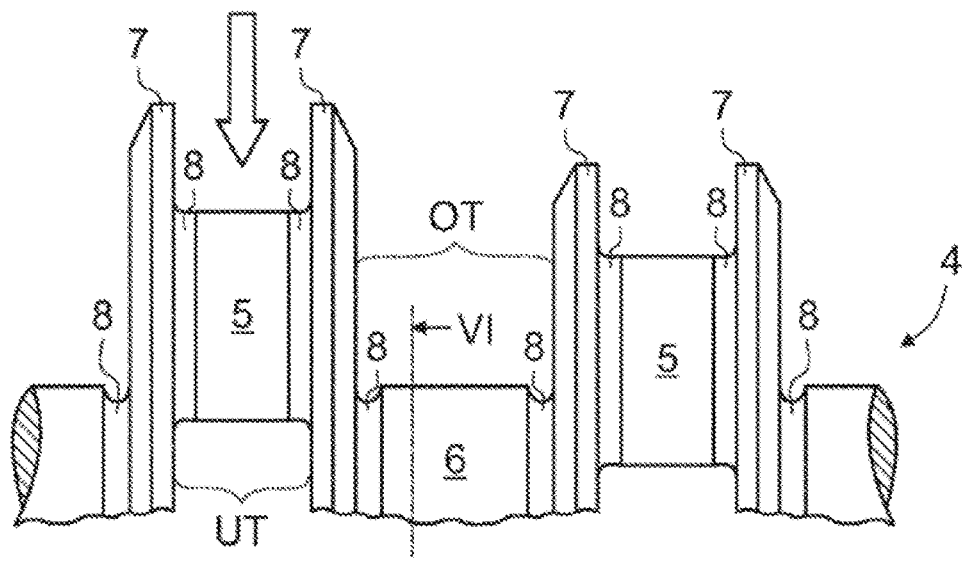

FIG. 5 illustrates an exemplary detail of a crankshaft 4 with respective transition radii 8 between connecting-rod bearing journals 5 and crank webs 7 and between main bearing journals 6 and crank webs 7.

According to the invention, provision is made whereby, for the introduction of the impact force $F_S$ into at least one of the transition radii 8, a highly loaded region $B_{MAX}$, a lightly loaded region $B_{MIN}$ and interposed intermediate regions $B_{ZW}$ are defined along the respective transition radius 8 running in annularly encircling fashion (around the connecting-rod bearing journal 5 and/or main bearing journal 6), wherein impact hardening is performed such that the impact force $F_S$ introduced into the intermediate regions $B_{ZW}$ is increased in the direction of the highly loaded region $B_{MAX}$.

Provision may be made here whereby the impact force $F_S$ that is introduced into the highly loaded region $B_{MAX}$ during the impact hardening is determined on the basis of the desired fatigue strength of the crankshaft 4 and/or the desired fatigue strength of portions of the crankshaft 4.

Depending on the engine operation or purpose of the crankshaft 4, the transition radii 8 respectively adjoining the journals 5, 6 may have highly loaded regions $B_{MAX}$ that are situated in each case at different positions. An exemplary loading of the crankshaft 4 is illustrated in FIG. 5 by means of an arrow. The connecting-rod bearing journal 5 is connected along the arrow via a piston (not illustrated) to the engine. That side of the connecting-rod bearing journal 5 to which the arrow points is in this case the so-called pressure side. The so-called bottom dead center BDC of the connecting-rod bearing journal 5 is situated at the side opposite the pressure side, specifically the tension side. From experience, the bending loading of the respective transition radii 8 is at its greatest at the bottom dead center BDC of the connecting-rod bearing journal 5. It is advantageously possible for the highly loaded region $B_{MAX}$ to be defined as adjoining, preferably symmetrically surrounding, the bottom dead center BDC.

In the case of the crankshaft 4 illustrated in FIG. 5, it is furthermore possible for a most highly loaded point of the main bearing journal 6 adjoining the connecting-rod bearing journal 5 to be a region which corresponds to the pressure side of the adjoining connecting-rod bearing journal 5. For simplicity, said region of a main bearing journal 6 will hereinafter be referred to as "top dead center" TDC.

Figure 6:
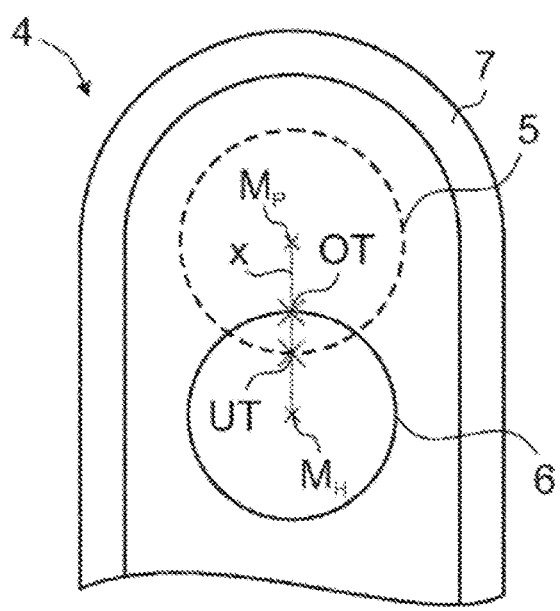

For improved illustration of the positions of the dead centers BDC and TDC, FIG. 6 shows a diagrammatic section through the crankshaft 4 along the illustrated section line "VI" in FIG. 5.

It can be seen here that the most highly loaded point or the top dead center TDC of a transition radius 8 of a main bearing journal 6 lies, in the cross section of the crankshaft 4, at the point of intersection of the transition radius 8 of the main bearing journal 6 with the connecting line x of the central points $M_H$, $M_P$ of the main bearing journal 6 and of the connecting-rod bearing journal 5 adjoining the transition radius 8 of the main bearing journal 6.

Figure 7:
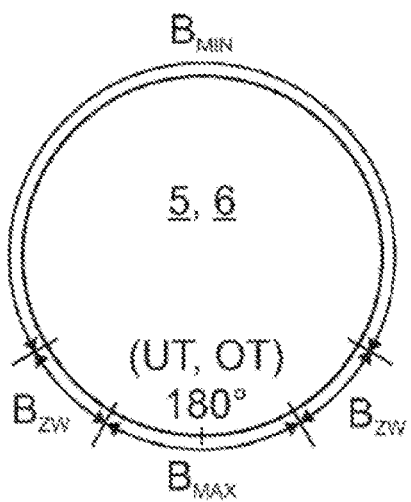

FIG. 7 shows a section through an exemplary journal 5, 6 for the purposes of illustrating the possible distribution of the regions $B_{MAX}$, $B_{MIN}$, $B_{ZW}$ along the circumference of the journal 5, 6.

In the present case, the most highly loaded point of the journal 5, 6, that is to say the bottom dead center BDC of a connecting-rod bearing journal 5 or the top dead center TDC of a main bearing journal 6, is denoted by 180°. Proceeding from this point, the highly loaded region $B_{MAX}$ is defined along the transition radius 8 running in annularly encircling fashion around the crankshaft 4. The highly loaded region $B_{MAX}$ may amount to at least ±20°, preferably at least ±30°, more preferably at least ±40°, particularly preferably at least ±50°, very particularly preferably at least ±60°, for example at least ±70°, at least ±80° or at least ±90° proceeding from this point, preferably symmetrically.

Adjoining the highly loaded region $B_{MAX}$, there are defined two intermediate regions $B_{ZW}$ which separate the highly loaded region $B_{MAX}$ from the lightly loaded region $B_{MIN}$. The intermediate regions $B_{ZW}$ may encompass any angle segment along the annularly encircling transition radius 8. The same applies to the lightly loaded region $B_{MIN}$. The respective angle ranges may be determined by calculations, simulation and/or test series, possibly also from measurements during real-time operation (of the engine).

The impact force $F_S$ introduced into the intermediate regions $B_{ZW}$ is preferably increased (preferably steadily) in the direction of the highly loaded region $B_{MAX}$. The statement that the impact force $F_S$ is increased means that the impact force $F_S$ is preferably progressively increased between successive impacts.

FIGS. 8 to 11 illustrate four exemplary profiles of the impact force $F_S$ along the circumference of a journal 5, 6, for example of the journal 5, 6 from FIG. 7.

Figure 8:
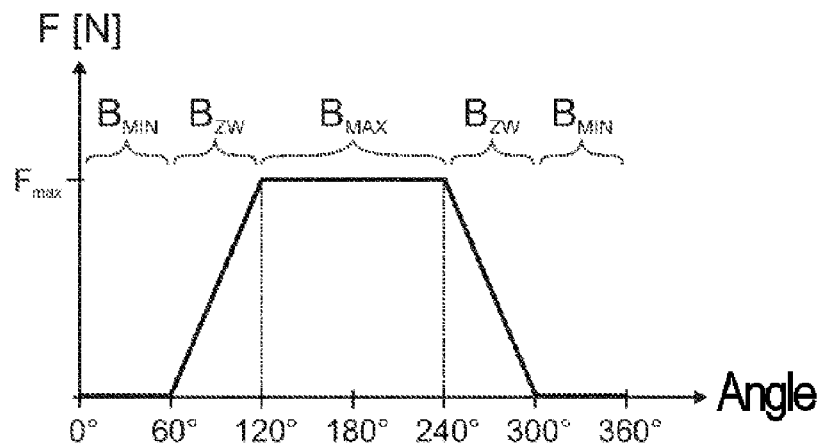
Figure 10:
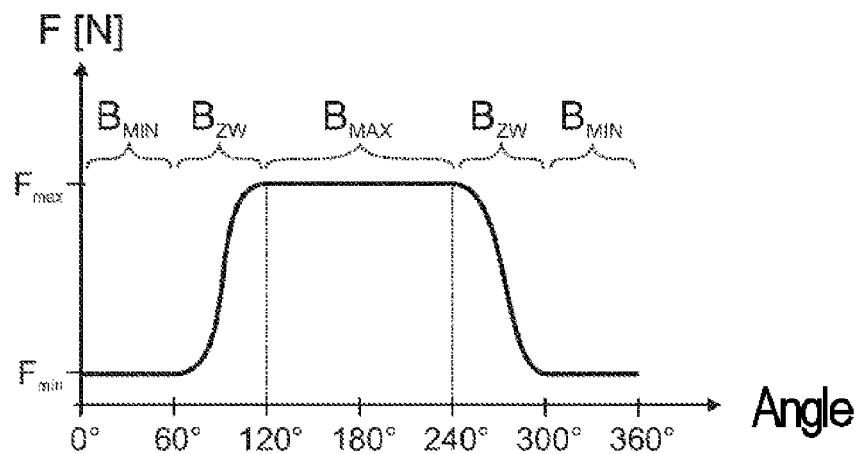

Here, in FIGS. 8, 10 and 11, the impact force $F_S$ that is introduced into the respective highly loaded region $B_{MAX}$ during the impact hardening is constant.

In all of the curves illustrated by way of example, the impact force $F_S$ introduced into the highly loaded regions $B_{MAX}$ during the impact hardening is greater than or at least equal to the respective maximum impact force $F_S$ that is introduced into the intermediate regions $B_{ZW}$ (and self-evidently in each case greater than the impact force $F_S$ that is introduced into the lightly loaded region $B_{MIN}$).

The maximum impact force $F_{MAX}$ is thus introduced in the highly loaded region $B_{MAX}$ of the transition radius 8.

Furthermore, FIGS. 8 and 11 show an exemplary force distribution in which, in each case, no impact force $F_S$ is introduced into the lightly loaded region $B_{MIN}$ during the impact hardening. By contrast, in FIGS. 9 and 10, in the in each case lightly loaded region $B_{MIN}$, an impact force $F_S$ is introduced during the impact hardening which is lower than the lowest impact force $F_S$ that is introduced into the intermediate regions $B_{ZW}$. Here, in the case of FIG. 10, a minimum impact force $F_{min}$ is provided, which is kept constant in the lightly loaded region $B_{MIN}$. By contrast, in FIG. 9, proceeding from the intermediate regions $B_{ZW}$ to the position situated opposite the most highly loaded point or the bottom dead center BDC or the top dead center TDC respectively, the impact force $F_S$ is reduced in steadily linear fashion to a minimum value, in the present case 0.

In FIG. 8, proceeding from the lightly loaded region $B_{MIN}$, in which for example no impact hardening is performed in the present case, the impact force $F_S$ introduced into the intermediate regions $B_{ZW}$ is increased uniformly and/or linearly to the highly loaded region $B_{MAX}$.

Figure 9:
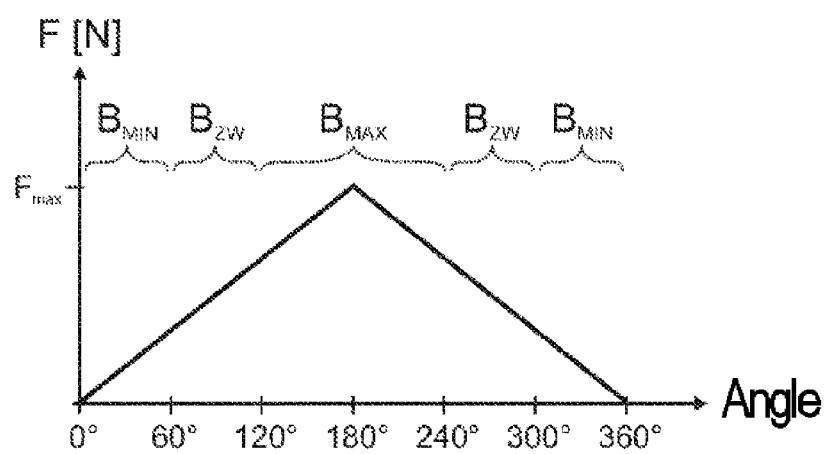

By contrast, in FIG. 9, the profile of the impact force $F_S$ follows a continuous ramp which, proceeding from a point situated opposite the most highly loaded point or the bottom dead center BDC or the top dead center TDC along the circumference of the crankshaft 4, increases in each case in the direction of the most highly loaded point or the bottom dead center BDC or the top dead center TDC respectively. Here, in the respective regions $B_{MIN}$, $B_{ZW}$ and $B_{MAX}$, the profile of the impact force $F_S$ follows a respectively associated ramp function, which collectively form the ramp illustrated.

FIG. 10 illustrates a profile of the impact force $F_S$ which is basically similar to the profile of the impact force $F_S$ of FIG. 8. In the intermediate regions $B_{ZW}$, however, by contrast to the linear or ramp-shaped variation of the impact force $F_S$ illustrated in FIG. 8, a smoothed curve profile is illustrated.

Finally, FIG. 11 shows a diagram in which the impact forces $F_S$ are varied in the intermediate regions $B_{ZW}$ in steps.

Finally, any variations and combinations, in particular (but not exclusively) of the profiles illustrated in FIGS. 8 to 11, may be provided. The invention is not restricted to a particular profile of the impact force $F_S$. A profile of the impact force $F_S$ along the circumference of the annularly encircling transition radius 8 may also be selected with regard to the engine operation or the purpose of the crankshaft 4.

Provision may be made whereby the impact head 21 of the at least one impact tool 16 introduces the impact force $F_S$ into the transition radius 8 at an impact angle α, wherein the impact force $F_S$ is adjustable. The impact angle α□may in particular be varied by virtue of the spacing d between the deflection point $U_P$ of the deflecting unit 20 and the front end of the respective impact head 21 of the impact tools 16 being adjustable.

The technical solution for the adjustment of the spacing d is illustrated in schematic form by dashed lines in FIG. 3. For example, a changeover device 30 with a magazine may be provided in order to exchange the at least one impact tool 16 and/or the impact head 21 and/or the deflecting unit 20 and/or the at least one impact device 1 in order to adjust the spacing d between the deflection point $U_P$ of the deflecting unit 20 and the front end of the impact head 21 of the at least one impact tool 16 to a different value. A changeover device 30 for the exchange of impact tools 16 is indicated in FIG. 3. For this purpose, the changeover device 30 comprises a selection of impact tools 16 of in each case different length. By exchanging an impact tool 16, the spacing d and thus the impact angle α can be adjusted.

Provision may also be made whereby the length of the impact tools 16 is adjustable, preferably telescopically. A corresponding construction is illustrated in FIG. 12. Here, FIG. 12 shows a detail of an impact device 1, which may be of substantially identical design to the embodiment of FIG. 3.

In FIG. 12, two telescopic impact tools 16 are schematically illustrated. By means of the adjustable length of the impact tools 16, the spacing d between the deflection point $U_P$ of the deflecting unit 20 and the front end of an impact head 21 is adjustable. In this way, it is thus indirectly also possible for the impact angle α and possibly also the impact position to be influenced.

Provision may also be made, as illustrated in FIG. 1, for multiple impact devices 1 to be used. The respective spacing d between the deflection point $U_P$ and impact heads 21 is then preferably not identical at least in the case of two impact devices 1. This makes it possible for the impact devices 1 to be used in each case for the impact hardening of a transition radius 8 or of a group of transition radii 8, wherein the impact tools 16 of the respective impact device 1 are in each case already adjusted to the preferentially provided impact angle α. Conversion of the impact device 1 is thus not necessary. If the crankshaft 4 has only transition radii 8 with two different advantageous impact angles α, it is thus preferably the case that two correspondingly preset impact devices 1 are sufficient.

Provision may for example be made whereby a first impact device 1 introduces impact forces $F_S$ at a first impact angle $α_1$ and a second impact device 1 introduces impact forces $F_S$ at a second impact angle $α_2$. Use may also be made of impact devices 1 in the case of which the spacing d and/or the impact angle α is adjustable in a different way. It is also possible for a conventional impact device to be combined with an impact device 1 with adjustable spacing d.

Provision may be made whereby the impact angle α between the longitudinal axis $L_S$ of the at least one impact tool 16 and a line $l_{KW}$ perpendicular to the longitudinal axis $C_{KW}$ of the crankshaft 4 amounts to 5° to 80°, preferably 10° to 70°, more preferably 20° to 60° and particularly preferably 30° to 55°, in particular 35° to 50°.

To illustrate the relationships, FIGS. 13 and 14 illustrate enlarged views which highly schematically illustrate an impact head 21 of an impact tool 16 and an exemplary transition radius 8 of a crankshaft 4. Here, in the example of FIG. 13, impact hardening is performed at a first impact angle $α_1$, and in FIG. 14, impact hardening is performed at a second impact angle $α_2$.

Through the corresponding adjustment of the impact angle α by means of the variation of the spacing d between the deflection point $U_P$ of the deflecting unit 20 and the impact head 21 of the impact tool 16, the direction of the impact force $F_S$ can be predefined, whereby the range of greatest effectiveness of the impact hardening can be set in targeted fashion.

Provision may also be made for the impact force $F_S$ to be reduced in targeted fashion or for the direction of action to be varied, for example if reduced cross sections, bores or other geometrical conditions necessitate this.

Preferably, the impact angle α is selected in accordance with the profile of a loading maximum $MAX_1$, $MAX_2$ of the transition radius 8, wherein the profile of the loading maximum $MAX_1$, $MAX_2$ is determined on the basis of simulations and/or calculations and/or series of tests of the respective crankshaft type.

In FIG. 14, the impact head 21 is positioned at the same position of the transition radius 8 as in FIG. 13. However, the spacing d between the deflection point $U_P$ of the deflecting unit 20 and the impact head 21 is set such that the impact tool 16 is aligned at a different impact angle α than in FIG. 13. It follows from this that the impact is introduced into the transition radius 8 at the angle $α_2$, even though the impact head 21 is basically applied at the same position as in FIG. 13.

The illustration in FIG. 14 differs to a particularly great extent from the illustration in FIG. 13 for illustrative purposes.

It is basically also possible for the positioning of the impact head 21 in the transition radius 8 to be varied, that is to say the impact head 21 could possibly also be applied at a different position along the circumference of the transition radius 8, wherein, at the same time, the impact angle α may be variable.

The impact head 21 may have a radius $r_S$ of which the magnitude amounts to 75% to 99% of the transition radius 8, preferably 85% to 98% of the transition radius 8 and particularly preferably 85% to 95% of the transition radius 8. The radius $r_S$ of the impact head 21 preferably substantially corresponds to the transition radius 8.

FIG. 15 (and the subsequent FIGS. 16 to 18) illustrate an exemplary transition radius 8 between a main bearing journal 6 and a crank web 7, in the case of which the impact hardening has been performed such that the impact impressions 28 of an impact head 21 of the impact tool 16 overlap along the transition radius 8 running in annularly encircling fashion around a main bearing journal 6.

To achieve this type of impact hardening, highly precise working or operation of the apparatus is necessary.

In particular if the impact spacings are set to be narrow, it is the case during a subsequent impact that the impact head 21 penetrates at least partially into the impact impression 28 of the preceding impact, whereby the impact force can exert a resetting rotational action on the crankshaft 4. The arresting device 12 that has already been illustrated may be provided and designed to prevent such a rotational movement. It may in particular be advantageous for the arresting device 12 to be designed to prevent rotation of the crankshaft 4 counter to the direction of rotation of the drive device 3.

In a particular variant of the invention, provision may thus be made whereby, for the impact hardening, the crankshaft 4 is firstly rotated by the drive device 3 along a direction of rotation into an impact position, wherein the arresting device 12 is provided in order to arrest the crankshaft 4 in the impact position, following which an impact force $F_S$ is introduced into at least one transition radius 8 by means of at least one impact tool 16.

FIGS. 16 and 17 illustrate further exemplary transition radii 8 between a main bearing journal 6 and a crank web 7, in the case of which the impact impressions 28 of an impact head 21 of the impact tool 16 overlap along the transition radius 8 running in annularly encircling fashion around the main bearing journal 6. As already mentioned above, during a subsequent impact, the impact head 21 may at least partially penetrate into the impact impression 28 of a preceding impact, giving rise to the "track" of impact impressions 28 illustrated in the figures. By contrast to the illustration in FIG. 15, the track of the impact impressions 28 is illustrated in simplified form in FIGS. 16 to 18.

In FIGS. 16 and 17, the impact hardening has been performed at different impact angles α. Here, for the purposes of the illustration in the figure, the impact impressions 28 run with a clearly visible offset with respect to one another on the circumference of the transition radius 8.

The deviation is in fact preferably only small, but nevertheless effective. The offset profile may be achieved by means of a changed impact angle α, as illustrated in FIG. 14, and/or by means of a changed point of application of the impact head 21. In the case of the transition radius 8 of FIG. 16, a smaller impact angle α was selected than in the case of the transition radius 8 of FIG. 17, that is to say the spacing d between the deflection point $U_P$ of the deflecting unit 20 and the impact head 21 of the impact tool 16 was set to be greater in the case of the method as per FIG. 16 than in the case of the transition radius 8 of FIG. 17. Accordingly, the impact impressions 28 run higher up, or closer to the crank web 7, in the case of the transition radius 8 illustrated in FIG. 17 than in the case of the transition radius 8 of FIG. 16.

Provision may also be made whereby, during the impact hardening of a transition radius 8, the impact angle α of an impact tool 16 is varied along the respective transition radius 8 running in annularly encircling fashion around the connecting-rod bearing journal 5 and/or main bearing journal 6. This is illustrated in FIG. 18.

Provision may be made whereby all transition radii 8 between connecting-rod bearing journals 5 and the crank webs 7 are impact-hardened with a first impact angle α and all transition radii 8 between the main bearing journals 6 and the crank webs 7 are impact-hardened at a second impact angle α.

Alternatively, provision may be made whereby at least two transition radii 8 between the connecting-rod bearing journals 5 and the crank webs 7 are impact-hardened at a different impact angle α, and/or whereby at least two transition radii 8 between the main bearing journals 6 and the crank webs 7 are impact-hardened at a different impact angle α, and/or whereby at least one transition radius 8 between the connecting-rod bearing journal 5 and the crank webs 7 is impact-hardened at a different impact angle α, than a transition radius 8 between the main bearing journals 6 and the crank webs 7.

FIG. 19 illustrates a method which relates to the particular variant of the invention with the arresting device 12 and which is basically composed of four steps (rotating, arresting, impacting, releasing).

For the operation of the drive device 3, which preferably comprises an electric motor, closed-loop position control may be used in order to rotate the crankshaft 4 into the respective impact position, wherein the crankshaft 4 is rotated preferably in stepped or clocked fashion.

After the crankshaft 4 has been rotated by the drive device 3 into the impact position, the crankshaft 4 is initially arrested in the impact position by the arresting device 12.

Subsequently, an impact force $F_S$ is introduced into at least one transition radius 8 of the crankshaft 4 by means of at least one impact tool 16.

Preferably, the controller of the drive device 3 and the controller of the arresting device 12 are synchronized with one another such that the arresting device 12 arrests the crankshaft 4 only when the crankshaft 4 is at a standstill in the impact position.

Furthermore, it is also possible for the controllers of the arresting device 12 and of the at least one impact tool 16 (or of the at least one impact device 1) to be synchronized such that the at least one impact tool 16 introduces the impact force into the transition radius 8 of the crankshaft 4 only when the crankshaft 4 has been arrested in the impact position. The arresting of the crankshaft 4 is subsequently released again.

The method may subsequently be repeated as often as desired along a transition radius 8, preferably for one complete rotation along the circumference of the transition radius 8 or along the annularly encircling transition radius 8. According to the invention, provision may also be made whereby no impact force $F_S$ is introduced in the lightly loaded region $B_{MIN}$. There is no need for a complete rotation to be performed. It is also possible for more than one rotation to be provided, for example 2 or 3 rotations.

After a transition radius 8 has been impact-hardened in the desired manner, the impact tool 16, or the entire impact device 1, can be moved to the next transition radius 8 that is to be hardened, following which the method (rotating, arresting, impacting, releasing) can be repeated along the next transition radius 8 running in annularly encircling fashion around the journal 5, 6.

The at least one impact tool 16 or the at least one impact device 1 may introduce the impact movement or the impact force $F_S$ with a periodicity, for example with a timing of 0.1

Hz to 50 Hz, preferably with a timing of 0.3 Hz to 10 Hz, particularly preferably with a timing of 0.5 Hz to 5 Hz and very particularly preferably with a timing of 0.5 Hz to 3 Hz.

An open-loop and/or closed-loop control device 29, preferably comprising a microprocessor, may be provided for carrying out the method. The open-loop and/or closed-loop control device 29 may for example also comprise or implement and/or synchronize the controllers of the drive device 3, of the arresting device 12 and/or of the at least one impact tool 16.

In particular, a computer program with program code means may be provided in order to carry out the method according to the invention when the program is executed on an open-loop and/or closed-loop control device 29, in particular on a microprocessor.

What is claimed is:

1. A method for the impact hardening of transition radii of a crankshaft, in a particular of transition radii between connecting-rod bearing journals and crank webs and/or transition radii between main bearing journals and the crank webs of the crankshaft for the introduction of an impact force into at least one of the transition radii, wherein a highly loaded region, a lightly loaded region and interposed intermediate regions are defined along the respective transition radius running in annularly encircling fashion around the crankshaft, wherein impact hardening is performed such that the impact force introduced into the intermediate regions is increased in the direction of the highly loaded region, wherein the impact head of the at least one impact tool introduces the impact force into the transition radius at an adjustable impact angle.

2. The method as claimed in claim 1, wherein the impact force introduced into the intermediate regions is increased steadily in the direction of the highly loaded region.

3. The method as claimed in claim 1, wherein the impact force introduced into the intermediate regions is increased in the direction of the highly loaded region.

4. The method as claimed in claim 1, wherein during the impact hardening, no impact force is introduced into the lightly loaded region.

5. The method as claimed in claim 1, wherein during the impact hardening, an impact force higher than or equal to the highest impact force introduced into the intermediate regions is introduced into the highly loaded region.

6. The method as claimed in claim 1, wherein the impact force that is introduced into the highly loaded region during the impact hardening is determined on the basis of the desired fatigue strength of the crankshaft.

7. The method as claimed in claim 1, wherein the impact force that is introduced into the highly loaded region during the impact hardening is constant.

8. The method as claimed in claim 1, wherein along the transition radius running in annularly encircling fashion around the connecting-rod bearing journal, the highly loaded region amounts to at least +/−20° proceeding from a most highly loaded point of the connecting-rod bearing journal.

9. The method as claimed in claim 1, wherein along the transition radius running in annularly encircling fashion around the main bearing journal, the highly loaded region amounts to at least +/−20° proceeding from a most highly loaded point of the main bearing journal.

10. The method as claimed in claim 9, wherein the most highly loaded point of a transition radius of a main bearing journal lies, in the cross section of the crankshaft, at the point of intersection of the transition radius of the main bearing journal with the connecting line of the central points of the main bearing journal and of the connecting-rod bearing journal adjoining the transition radius of the main bearing journal.

11. The method as claimed in claim 1, wherein the impact hardening is performed in such a way that the impressions of an impact head of at least one impact tool overlap in a defined manner along the respective transition radius running in annularly encircling fashion around the crankshaft.

12. The method as claimed in claim 1, wherein, for the impact hardening, an impact device is used which has an impact piston, a deflecting unit and the at least one impact tool, wherein the at least one impact tool is fastened to the deflecting unit, and wherein the impact piston transmits an impulse to the at least one impact tool by means of the deflecting unit, following which the impact head of the at least one impact tool introduces the impact force into the transition radius at the impact angle, and wherein the impact angle is set through adjustment of the spacing between a deflecting point of the deflecting unit and the front end of the impact head of the at least one impact tool.

13. The method as claimed in claim 1, wherein, for the impact hardening, the crankshaft is firstly rotated by means of a drive device along a direction of rotation into an impact position, wherein an arresting device is provided in order to arrest the crankshaft in the impact position, following which the impact force is introduced into at least one transition radius by means of at least one impact tool.

14. The method as claimed in claim 1, wherein the impact force introduced into the intermediate regions is increased uniformly in the direction of the highly loaded region.

15. The method as claimed in claim 1, wherein the impact force introduced into the intermediate regions is increased linearly in the direction of the highly loaded region.

16. The method as claimed in claim 1, wherein during the impact hardening, an impact force lower than or equal to the lowest impact force introduced into the intermediate regions is introduced into the lightly loaded region.

17. The method as claimed in claim 1, wherein the impact force that is introduced into the highly loaded region during the impact hardening is determined on the basis of the desired fatigue strength of portions of the crankshaft.

* * * * *

UNITED STATES PATENT AND TRADEMARK OFFICE
CERTIFICATE OF CORRECTION

PATENT NO. : 11,141,819 B2  
APPLICATION NO. : 16/622650  
DATED : October 12, 2021  
INVENTOR(S) : Reeb et al.

It is certified that error appears in the above-identified patent and that said Letters Patent is hereby corrected as shown below:

In the Specification

Column 6, Line 41 "re-ion" should be "region"

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*